United States Patent [19]

Harada et al.

[11] Patent Number: 4,884,651

[45] Date of Patent: Dec. 5, 1989

[54] VEHICLE SLIP CONTROL APPARATUS

[75] Inventors: Yasuhiro Harada; Kazutoshi Nobumoto; Eizi Nishimura; Toru Onaka, all of Hiroshima, Japan

[73] Assignee: Mazda Motor Corporation, Hiroshima, Japan

[21] Appl. No.: 76,172

[22] Filed: Jul. 21, 1987

[30] Foreign Application Priority Data

Jul. 24, 1986 [JP] Japan .................................. 61-172700
Jul. 30, 1986 [JP] Japan .................................. 61-177776

[51] Int. Cl.$^4$ ............................................. B60K 31/00
[52] U.S. Cl. ................................ 180/197; 364/426.03; 303/92
[58] Field of Search ....................... 180/197, 249, 248; 303/92, 95, 96, 103; 364/426, 426.03

[56] References Cited

U.S. PATENT DOCUMENTS

| | | | |
|---|---|---|---|
| 4,361,871 | 11/1982 | Miller et al. | 180/197 X |
| 4,484,280 | 11/1984 | Brugger et al. | 303/92 X |
| 4,538,700 | 9/1985 | Suzuki | 180/197 X |
| 4,583,611 | 4/1986 | Frank et al. | 180/197 |
| 4,591,213 | 5/1986 | Rapoport | 303/92 X |
| 4,625,824 | 12/1986 | Leiber | 180/197 |
| 4,681,374 | 7/1987 | Nakamura et al. | 180/197 X |
| 4,685,547 | 8/1987 | Ohashi et al. | 180/197 X |
| 4,703,823 | 11/1987 | Yogo et al. | 180/197 |
| 4,739,856 | 4/1988 | Inagaki et al. | 180/197 |

FOREIGN PATENT DOCUMENTS 3143666  5/1983  Fed. Rep. of Germany ...... 180/197

Primary Examiner—John A. Pekar
Attorney, Agent, or Firm—Wegner & Bretschneider

[57] ABSTRACT

The vehicle slip control apparatus is designed so as to enable the slip control to be done by causing the output torque of the engine to be reduced and operating the brake when an amount of a slip or spinning of the driven wheels is large. A control ratio of the slip control by the brake to the slip control by the engine is altered to an optimum value in accordance with requirements for the driving of the vehicle.

20 Claims, 16 Drawing Sheets

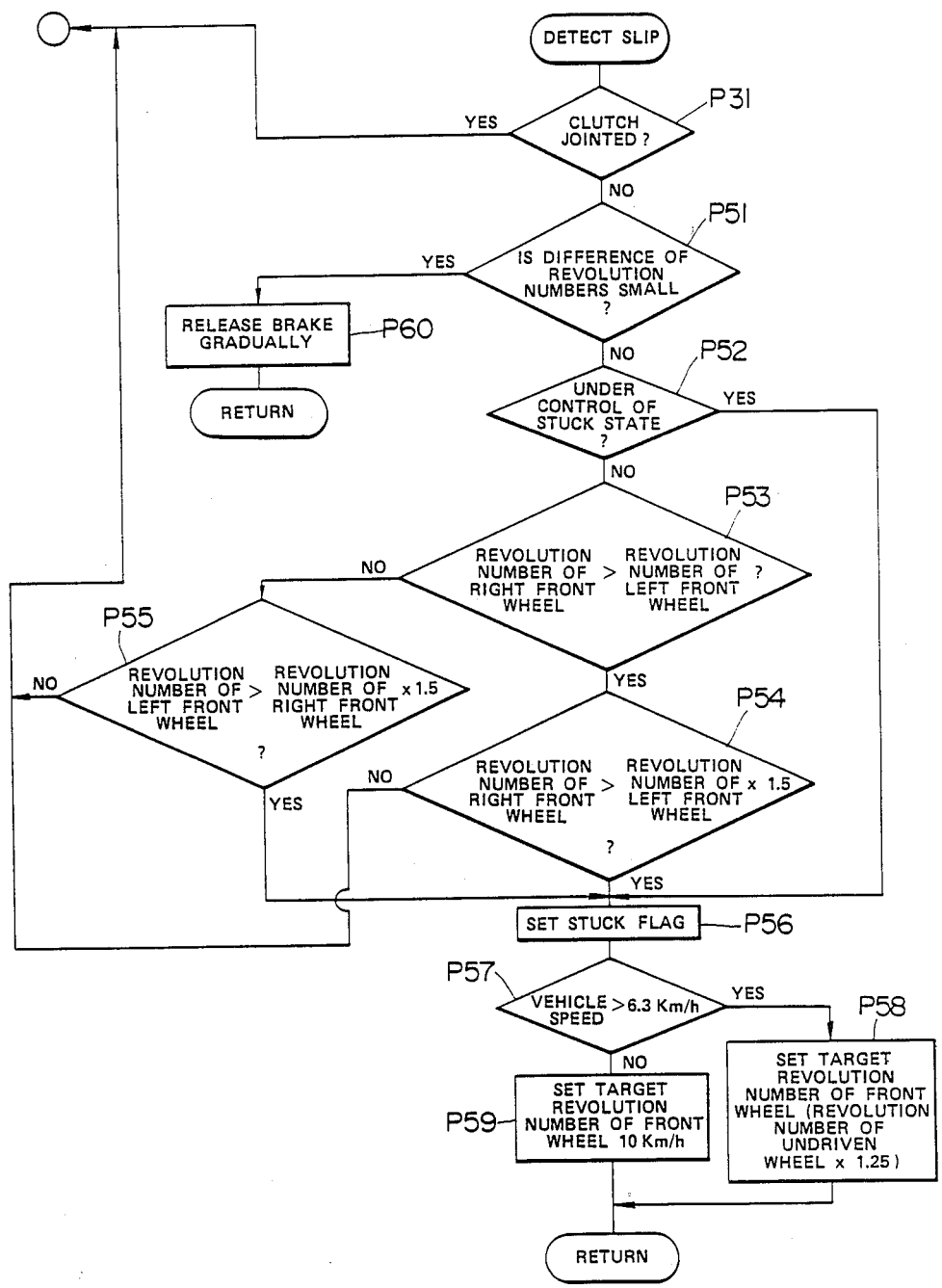

VEHICLE SLIP CONTROL APPARATUS

FIELD OF THE INVENTION

The present invention relates to a vehicle slip control apparatus and, more particularly, to a slip control apparatus of a vehicle designed to prevent the driven wheels from slipping or spinning excessively on a road surface by controlling a torque transmitted to the driven wheels.

BACKGROUND OF THE INVENTION

Prevention of the driven wheels from an excessive slip or spinning on a road surface is extremely useful for the sake of safety as well as for an effective provision with the driving force of a vehicle. The prevention may be achieved by decreasing a torque to be transmitted to the driven wheels—a torque being the cause of the slip or spinning.

Slip control systems of this type are disclosed in Japanese Patent Early Publication (Laid-Open) No. 16,948/1983 (corresponding to U.S. Pat. No. 4,484,280) and Japanese Patent Early Publication (Laid-Open) No. 56,662/1985 (corresponding to U.S. Pat. No. 4,583,611). The systems disclosed in these two prior patent applications involve, in each case, a technique using the application of a braking force by the brake to the driven wheels and a reduction in the output torque of the engine itself in order to decrease the torque to be transmitted to the driven wheels. More specifically, Japanese Patent Early Publication No. 16,948/1983 discloses a system in which the braking of the driven wheels only is carried out when a slip of the driven wheels is small, on the one hand, and the output torque of the engine is caused to be decreased, in addition to the braking of the driven wheels, when the slip of the driven wheels becomes large, on the other hand. Japanese Patent Early Publication No. 56,662/1985 discloses a system in which, when a slip of only one side of the left and right driven wheels is larger than that of the other side thereof, the one side thereof alone is braked and, when slips of both the left and right driven wheels are large, the both sides of the driven wheels are braked and further the output torque by the engine is caused to be reduced. The prior art systems as disclosed in the above patent applications are such that the braking of the driven wheels by the brake is primarily utilized and the reduction in the output torque of the engine is secondarily utilized.

Both the slip control by regulating the braking force and the slip control by controlling the output torque, as have been described above, have each advantages and disadvantages. The slip control using the braking force, on the one hand, is superior in response, while it is likely to cause a shock, leading to the impairment of the driving feeling. Furthermore, it is disadvantageous in terms of an effective use of the energy or a durability of the brake. The slip control regulating the output torque, on the other hand, provides a smooth variation in the torque to thereby secure a favorable driving feeling and outputs no useless torque to thereby improve an energy efficiency, while it is disadvantageous in terms of responsiveness.

From the foregoing, it is found extremely preferable to carry out both the slip control using the braking force and the slip control by the reduction in the output torque from the engine, when an amount of the slip or spinning of at least the driven wheels is large. Furthermore, the use of the two slip controls is preferable to secure a quick response, a good driving feeling, a high energy efficiency and a high durability of the brake in a favorably balanced manner.

In conducting both the slip control using the braking force and the slip control by regulating the output torque, however, the issue is to determine what ratio a reduced torque submitted to the driven wheels for the slip control should account for in a control ratio of a torque amount reduced by a reduction in the output torque to a torque amount reduced by the braking force. If such a control ratio is set constant as an optimum value for a certain driving condition, it is not always satisfactory for other driving conditions. This issue should be taken into considerations in instances where a vehicle is stuck in the mud or the like or where an operator prefers.

When an operator requires acceleration, a quick response is desirable while the driven wheels are prevented from slipping or spinning excessively by the slip control. In particular, in instances where the above control ratio is set from the viewpoint of lessening a frequency of the use of the brake, the output torque of the engine as a power source is caused to be reduced to a large extent. Accordingly, the issue in this instance is how to prevent the impairment of the acceleration accompanied with the reduction in the output torque, viz., how to prevent a delay in an increase in the output torque.

There are instances where the vehicle cannot move with the driven wheel or wheels stuck in the mud or the like. In these cases, an operator should operate the vehicle slowly by using a clutch in a skillful manner while controlling the slip of the driven wheel or wheels. In order to make the start-up of the vehicle in a stuck manner, it is also possible to use the slip control of the driven wheel or wheels while being stuck. In this case, the issue is how to match phenomena caused to occur by the slip control with a feeling of the operator, while the operator uses the clutch or accelerator skillfully as have been described above, in such a manner that the operator holds no undesirable feeling. When the vehicle is stuck, an amount of the slip or spinning of the driven wheel becomes considerably large so that both the slip control by the braking force and the slip control by reducing the output torque are used.

Further, if the driving feeling during the slip control could be set so as to meet an operator's preference, particularly a skill of the operator, it is extremely useful from the practical point of view.

SUMMARY OF THE INVENTION

A primary object of the present invention is to provide a vehicle slip control apparatus in which a control ratio of the slip control by reducing the output torque to the slip control by the braking force is set to become an optimum value in accordance with a requirement for driving a vehicle, when the slip control of the driven wheel is conducted using the braking force against the driven wheel and the reduction in the output torque of a power source such as an engine.

Another object of the present invention is to provide a vehicle slip control apparatus capable of enabling a quick response to a requirement for acceleration when the slip control of the driven wheel is conducted using both the slip control by the braking force and slip control by the reduction in the output torque of the power source such as the engine.

A further object of the present invention is to provide a vehicle slip control apparatus in which the slip control to be conducted while the vehicle is in a stuck state can be performed in a manner such that the operator does not hold an undesirable feeling, while the slip control during the running in an ordinary driving mode is set so as to become optimum.

A still further object of the present invention is to provide a vehicle slip control apparatus capable of setting the driving feeling, particularly the accelerating feeling, so as to match with the operator's preference when the slip control of the driven wheel is conducted using both the braking force against the driven wheel and the reduction in the output torque of the power source such as the engine.

In accordance with the present invention, the primary object of the present invention as described above may be achieved by the arrangement, as shown as a block diagram in FIG. 21, comprising output torque adjusting means for adjusting the output torque of a power source functioning as a source of the output of the torque; braking force adjusting means for adjusting the braking force of a brake for the driven wheel; slip detecting means for detecting a state of the slip or spinning of the driven wheel against a road surface; slip controlling means for controlling the slip or spinning of the driven wheel by reducing the output torque of the power source by way of said output torque adjusting means and by applying the braking force to the driven wheel by way of said braking force adjusting means in response to an output from said slip detecting means, when an amount of the slip or spinning of the driven wheel is larger than a predetermined value; control ratio altering means for altering a control ratio of the slip control by the reduction in the output torque from said power source to the slip control by the application of the braking force to the driven wheel; and instructing means for instructing the alteration of the control ratio to said control ratio altering means in accordance with a requirement for the driving of the vehicle.

This arrangement of the vehicle slip control apparatus according to the present invention enables the control ratio of the slip control by the braking force to the slip control by the reduction of the output torque to become always an optimum value in accordance with a requirement for the driving.

In accordance with the present invention, the another object is constructed in such a manner that the instructing means as being arranged to achieve the above primary object thereof is designed capable of giving an instruction so as to enlarge the control ratio by the application of the braking force during the requirement for acceleration by detecting the presence or absence of the operator's requirement for acceleration.

This arrangement can balance the application of the braking force with the reduction of the output torque in an optimum manner according to their characteristics as well as provide a favorable responsiveness to acceleration. If a ratio of the slip control by the brake gets larger, the output torque from the power source is controlled by way of the brake to a greater extent. In other words, the power source outputs a considerably great surplus of the torque during the slip control. Thus, as the brake is released when the slip or spinning of the driven wheel is being reduced, a quick acceleration can be achieved using the surplus torque. When no acceleration is required, a ratio of the slip control by the brake is rendered smaller, thus leading to a better driving feeling, a higher energy efficiency and a higher durability of the brake.

The further object according to the present invention as described above may be achieved by the arrangement in which the instructing means to achieve the above primary object thereof is designed so as to enlarge a ratio of the application of the braking force to the driven wheel when the driven wheel is stuck by detecting whether or not the vehicle is in a stuck state.

While the ratio of the braking force applied to the driven wheel gets larger, the ratio of the reduction in the output torque from the power source gets smaller relatively, if the control ratio is kept constant. This arrangement gives the operator a desirable feeling during a skillful operation of the accelerator while the vehicle is stuck. This can also provide the operator with the feeling of an easy start of the vehicle on a slippery road such as a now-covered road and prevent the torque from being removed from either of the right and left driven wheels while driving on a split road. Of course, while the vehicle is not stuck, the ratio of the slip control by the brake is not rendered unnecessrily higher so that a better driving feeling, a higher energy efficiency and a higher durability of the brake can be secured.

In accordance with the present invention, the still further object as have been described above is arranged to achieve the primary object of the present invention by a modification of the arrangement for the primary object thereof, in which the instructing means is designed to be a manual switch capable of selecting one control ratio from at least two predetermined control ratios.

Other objects and advantages of the present invention will become apparent during the course of the following description by way of embodiments that follow.

DETAILED DESCRIPTION OF THE PREFERRED EMBODIMENTS

Brief Description on Overall Construction

Figure 1:
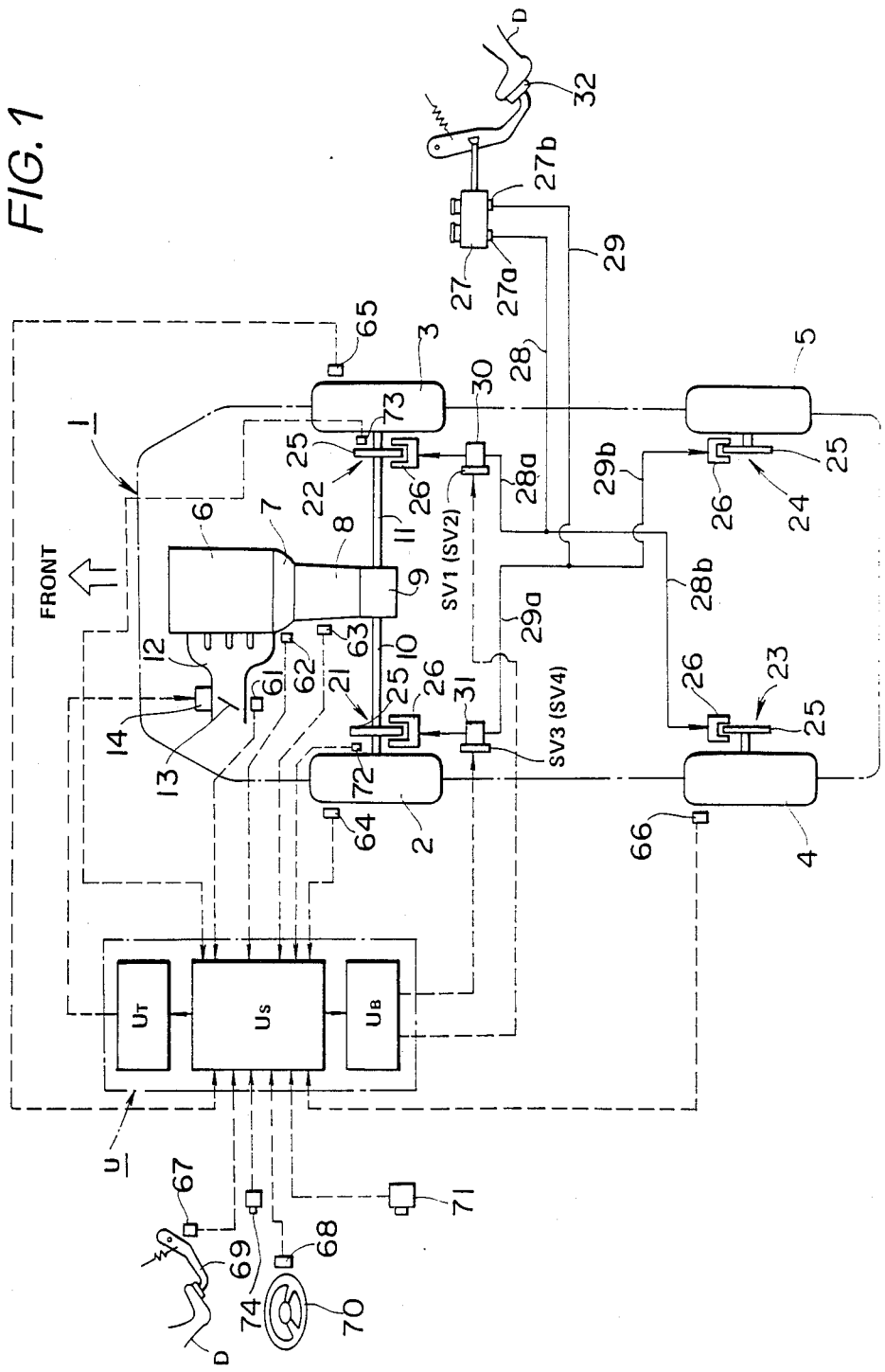
FIG. 1 is an overall schematic diagram illustrating an embodiment according to the present invention.

In FIG. 1, an automobile 1 contains a left front wheel 2 and a right front wheel 3, which function as driving (driven) wheels, and a left rear wheel 4 and a right rear wheel 5, which function as leading (undriven) wheels. In the front of the automobile 1 is mounted an engine 6 as a power source, which generates torques that are transmitted to a clutch 7, a transmission 8 and a differential gear 9 and then through a left drive shaft 10 and a right drive shaft 11 to the respective left and right front wheels 2 and 3 as the driving wheels. In this embodiment, the automobile 1 used is of the FF (front-engine/-front-drive) type.

In this embodiment, the engine 6 used as the power source is shown to carry out the load control, that is, the control of the torques generated, by a throttle valve 13 mounted on an air intake passage 12. More specifically, the engine 6 is a gasoline engine of the type that the torques generated are varied with an amount of intake air. The control of the intake air amount may be conducted by the throttle valve 13, and the throttle valve 13 is electromagnetically opened or closed by a throttle actuator 14. The throttle actuator 14 may be composed of, for example, a DC motor, a stepping motor or any appropriate means that may be electromagnetically controlled by fluid pressures such as hydraulic pressures.

The wheels 2 to 5 are provided, respectively, with a brake 21, 22, 23 and 24, each of which may be a disk brake. The disk brake is provided with a disk 25 rotating with the respective wheels and a caliper 26 that holds a brake pad and is provided with a wheel cylinder. The caliper 26 is designed so as to generate a braking force by pressing the brake pad on the disk 25 in accordance with a magnitude of the brake pressure to be supplied on the wheel cylinder.

A master cylinder 27 functioning as a source of generating the brake pressure may be of the tandem type having two discharging openings 27a and 27b. A braking pipe 28, on the one hand, extends from the discharging opening 27a and it is branched along the line into branch pipes 28a and 28b, the branch pipe 28a being connected to the brake 22, more specifically, to the wheel cylinder thereof, for the right front wheel and the branch pipe 28b being connected to the brake 23 for the left rear wheel. A braking pipe 29, on the other, extends from the discharging opening 27b and it is branched along the line into branch pipes 29a and 29b, the branch pipe 29a being connected to the brake 21 for the left front wheel and the branch pipe 29b being connected to the brake 24 for the right rear wheel. As described hereinabove, the braking pipe system may be of a so-called 2-system X type. To the branch pipes 28a and 29a for the respective brakes 21 and 22 of the front wheels functioning as the driving wheels are connected, respectively, hydraulic pressure control valves 30 and 31 of the electromagnetic type as means for controlling a braking force. It is noted as a matter of course that the brake pressure generating on the master cylinder 27 is of the type that varies with pressures generated by a brake pedal 32 applied by the force stepped by an operator D.

BRAKE PRESSURE REGULATING CIRCUIT

Figure 2:
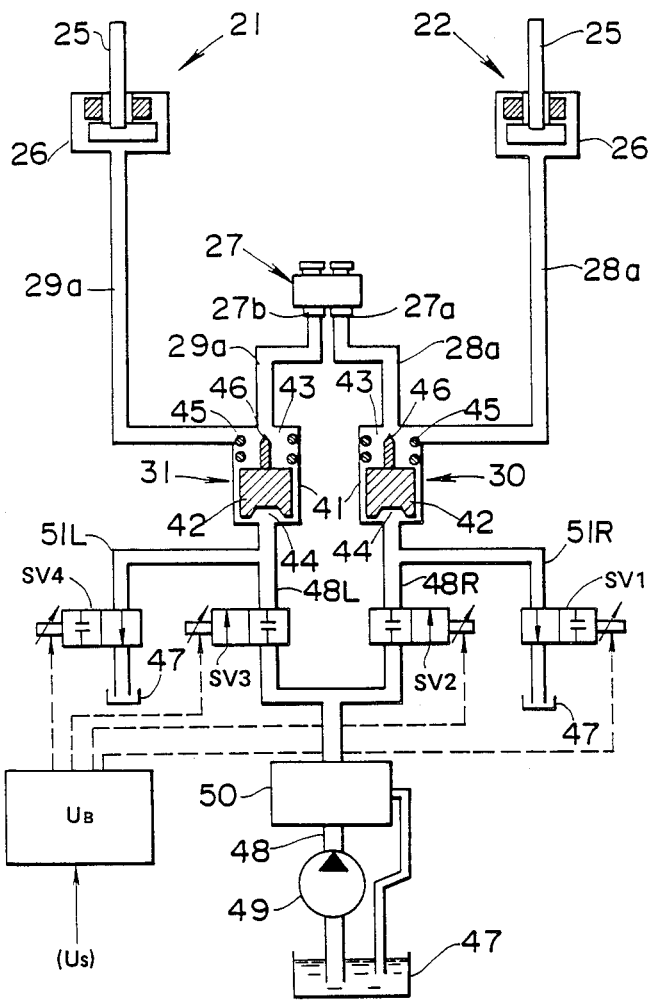
FIG. 2 is a diagram illustrating a hydraulic brake control circuit.

As shown specifically in FIG. 2, each of the control valves 30 and 31 are provided with a cylinder 41 and a piston 42 inserted slidably in the cylinder 41. The piston 42 divides the cylinder 41 into a volume-variable chamber 43 and a control chamber 44. The volume-variable chamber 43 works as a passage of the brake pressure against the brakes 21 and 22 from the master cylinder 27. Accordingly, the brake pressure is caused to generate against the brakes 21 and 22 as the volume of the volume-variable chamber 43 is varied in accordance with adjustment of a displacement position of the piston 42 and the brake pressure generated is allowed to be increased, decreased or retained.

The piston 42 is caused to be always actuated by a return spring 45 in the direction so as to cause the volume in the volumevariable chamber 43 to be enlarged. The piston 42 is integrated with a check valve 46. When the piston 42 is caused to displace in the direction causing the volume in the volume-variable chamber 43 to be decreased, an inlet to the volume-variable chamber 43 is closed, whereby the brake pressure generated by the volume-variable chamber 43 works merely on the brake 21 and 22 and do not act on the brakes 23 and 24 for the rear wheels 4 and 5 functioning as the leading wheels.

The adjustment of the displacement position of the piston 42 is carried out by adjusting the regulation of the hydraulic pressure against the control chamber 44. More specifically, a supply pipe 48 extending from a reservoir 47 is branched along the line into two branch pipes 48R and 48L, one branch pipe 48R being connected to the control chamber 44 of the valve 30 and the other branch pipe 48L being connected to the control chamber 44 of the valve 31. To the supply pipe 48 are connected a pump 49 and a relief valve 50. To the branch pipes 48R and 48L are connected, respectively, supply valves SV2 and SV3 consisting each of an electromagnetically switching (open-close) valve. Each of the control valves 44 is additionally connected to the reservoir 47 through discharge pipes 51R and 51L, the discharge pipe 51R being connected with a discharge valve SV1 consisting of an electromagnetically switching valve and the discharge pipe 51L being connected with a discharge valve SV4 consisting of an electromagnetically switching valve.

When the braking is effected using each of the hydraulic pressure regulating valves 30 and 31, that is, when the slip control is conducted, a brake does not effectively work basically by way of operation of the brake pedal 32 due to an action of the check valve 46. When the brake pressure to be generated by the hydraulic pressure regulating valve 30 or 31 is small, for example, when the pressure is decreased, the brake works by way of operation of the brake pedal 32. Of course, when no brake pressure for the slip control is generated by the hydraulic pressure regulating valve 30 or 31, a usual braking action arising from operation of the brake pedal 32 works because the master cylinder 27 is caused to communicate with the brake 21 or 22.

Each of the valves SV1 to SV4, inclusive, is controlled by opening or closing by way of a brake control unit $U_B$ as will be described more in detail below. The table below demonstrates relationships of a state of the brake pressure against the brakes 21 and 22 with operation of each of the valves SV1 to SV4, inclusive.

|  |  | VALVES | | | |
|---|---|---|---|---|---|
|  |  | SV 1 | SV 2 | SV 3 | SV 4 |
| BRAKE 21 | Increase Pressure | — | — | Opened | Closed |
|  | Decrease Pressure | — | — | Closed | Opened |
|  | Retain Pressure | — | — | Closed | Closed |
| BRAKE 22 | Increase Pressure | Closed | Opened | — | — |
|  | Decrease Pressure | Opened | Closed | — | — |
|  | Retain Pressure | Closed | Closed | — | — |

BRIEF CONSTRUCTIONS OF CONTROL UNITS

Referring to FIG. 1, reference symbol U denotes generally a control unit group consisting roughly of a throttle control unit $U_T$ and a slip control unit $U_S$ as well as a brake control unit $U_B$. The brake control unit $U_B$ is designed so as to control the opening or closing of each of the valves SV1 to SV4, inclusive, as have been described above, on the basis of signals output from the slip control unit $U_S$. The throttle control unit $U_T$ is to control the driving of the throttle actuator 14 on the basis of signals output from the slip control unit $U_S$.

Figure 19:
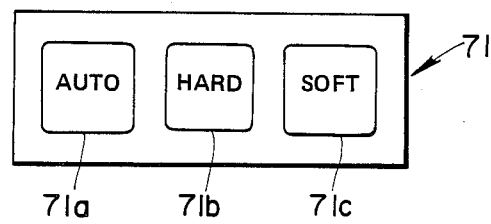
FIG. 19 is a view illustrating a switch for the alteration of the control ratio.
Figure 20:
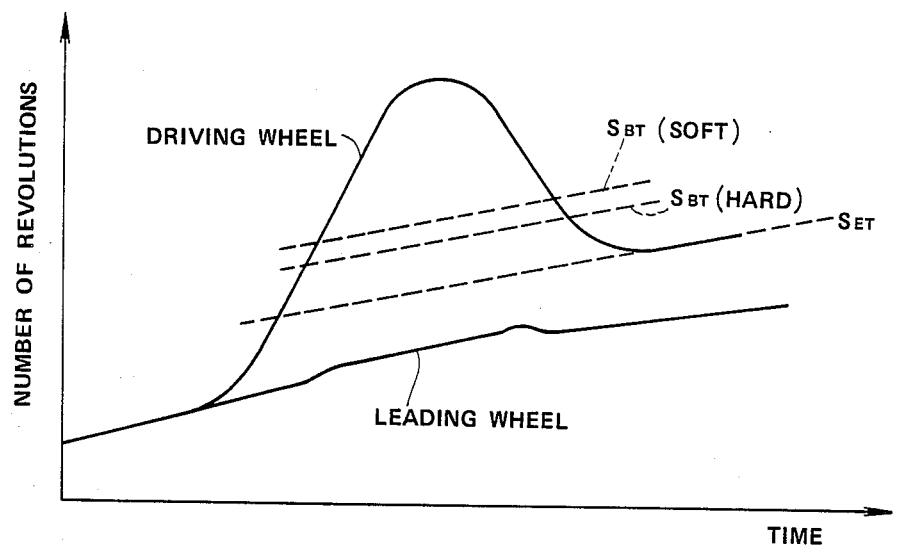
FIG. 20 is a graph illustrating an example of control ratios selectable by the switch of FIG. 19.
Figure 21:
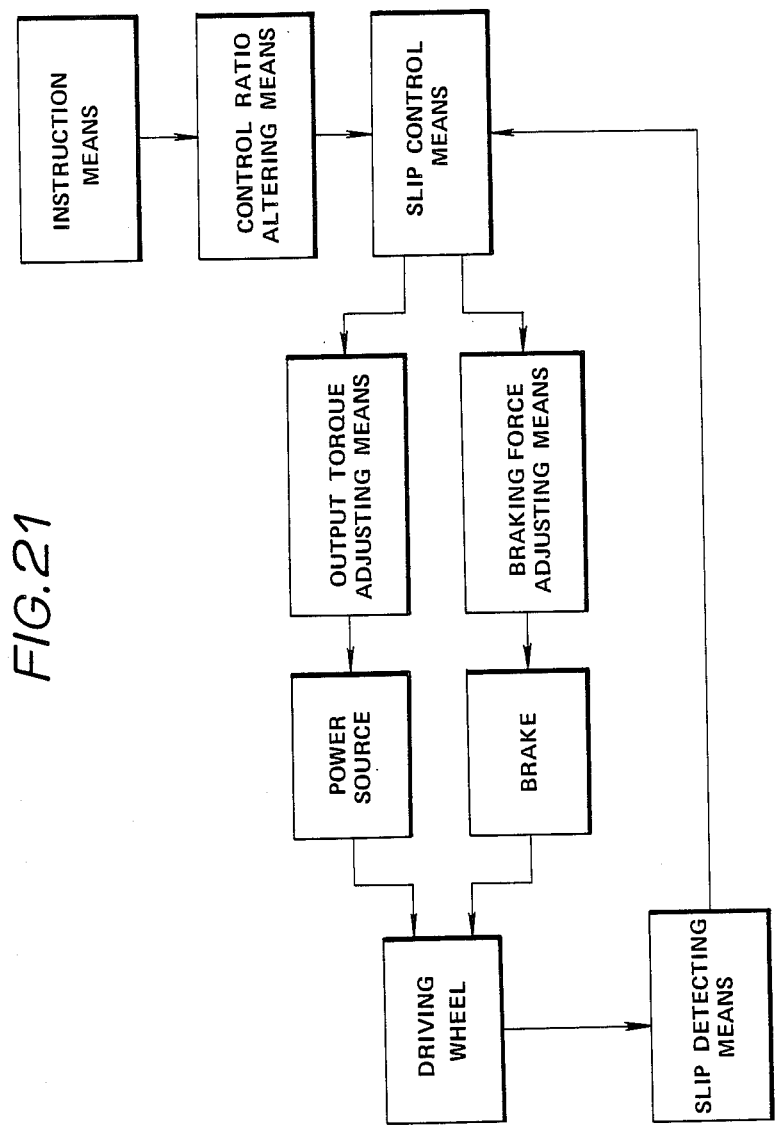
FIG. 21 is a block diagram showing an overall construction of the present invention.

The slip control unit $U_S$ comprises a computer of the digital type, more specifically, a microcomputer. The slip control unit $U_S$ is provided with signals output from each of sensors or switches 61 to 68 and 71 to 74, inclusive. The sensor 61 is to detect a degree of the opening of the throttle valve 13. The sensor 62 is to detect whether or not the clutch 7 is jointed. The sensor 63 is to detect the number of speeds of the transmission 8. The sensors 64 and 65 are, respectively, to detect the numbers of revolutions of the lefthand and righthand front wheels 2 and 3 as the driving wheels. The sensor 66 is to detect the number of revolutions of the rear wheel 4 as the leading wheel, that is, a vehicle speed. The sensor 67 is to detect an amount of operation of an accelerator 69, that is, an opening of the accelerator. The sensor 68 is to detect an amount of operation of a steering wheel 70, that is, a steering angle. The switch 71 comprises mode selecting means according to a manual operation by the operator D and has a construction as illustrated in FIG. 19. The switch 71 has a button 71a represented by reference symbol "AUTO", a buttom 71b represented by "HARD" and a buttom 71c represented by "SOFT". The slip controls using the buttons 71a, 71b and 71c will be described in detail below.

The sensors 72 and 73 are, respectively, to detect whether or not the brakes 21 and 22 for the driven wheels are in a over heated state. The switch 74 is to input a requirement for acceleration by a manual operation by the operator D.

The slip control unit $U_S$ is provided basically with a CPU, a ROM, a RAM, a CLOCK and an output/input interface as well as an A/D converter or a D/A converter in accordance with input signals or output signals. This is the same when a microcomputer is employed so that detailed description thereon will be omitted herein for the brevity of description. A description on maps, however, will be made herein by referring to those memorized in a ROM of the control unit $U_S$.

The following is a description on the control manner of the control unit group U. A slip ratio S used therefor may be defined by the following relationship (1):

$$S = W_D - W_L / W_D \qquad (1)$$

where $W_D$ is the number of revolutions of the driven wheels (2 and 3) and
$W_L$ is the number of revolutions of the undriven wheel (4), that is, the vehicle speed.

THROTTLE CONTROL

Figure 12:
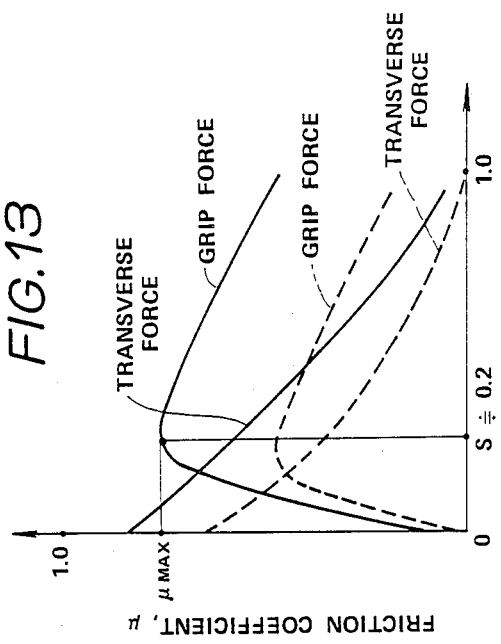
FIG. 12 is a graph illustrating the character of the throttle opening with respect to the accelerator opening when no slip control is conducted.

The throttle control unit $U_T$ is designed to conduct the feedback control of the throttle valve 13 (or the throttle actuator 14) so as to become a target throttle opening. When no slip control is conducted during the throttle control, the target throttle opening is regulated so as to be proportional by a 1-to -1 ratio to the amount of operation of the accelerator 69 by an operator D. FIG. 12 shows one example of the relationship of the throttle opening with the accelerator opening. The throttle control unit $U_T$ is also designed so as to carry out the throttle control to become a target throttle opening Tn integrated by the slip control unit $U_S$, upon the slip control, without following the characteristic demonstrated in FIG. 12.

The feedback control of the throttle valve 13 using the throttle control unit $U_T$ is designed in this embodiment to be carried out by way of the PI-PD control so as to compensate for a variation in response speeds of the engine 6. That is, the opening of the throttle valve 13 is regulated by way of the PI-PD control to coincide the present slip ratio with the target slip ratio during the slip control of the driven weels. More specifically, the target throttle opening Tn during the slip control can be given by the following relationship (2):

$$T_n = T_{n-1} + K_I \times (W_{Ln}/1 - S_{ET} - W_{Dn}) + K_P \times (W_{Ln} - W_{Ln-1}/1 - S_{ET} - W_{Dn} + W_{Dn-1}) - F_P(W_{Dn} - W_{Dn-1}) - F_D(W_{Dn-2} \times W_{Dn-1} + W_{Dn-2}) \qquad (2)$$

where $W_L$ is the number of revolutions of the undriven wheel (4);
$W_D$ is the number of revolutions of the driven wheels (2 and 3);
$K_P$ is a proportional coefficient;
$K_I$ is an integral coefficient;
$F_P$ is a proportional coefficient;
$F_D$ is a differential coefficient; and
$S_{ET}$ is a target slip ratio for the throttle control.

As given by the above relationship (2), the numbers of revolutions of the driven wheels are regulated by way of the feedback control so as to cause the throttle opening Tn to become a predetermined target slip ratio $S_{ET}$. In other words, as is apparent from the above relationship (1), the throttle opening is regulated so as for the target revolution numbers of the driven wheels, $W_{ET}$, to have the following relationship (3):

$$W_{ET} = W_L / 1 - S_{ET} \qquad (3)$$

Figure 3:
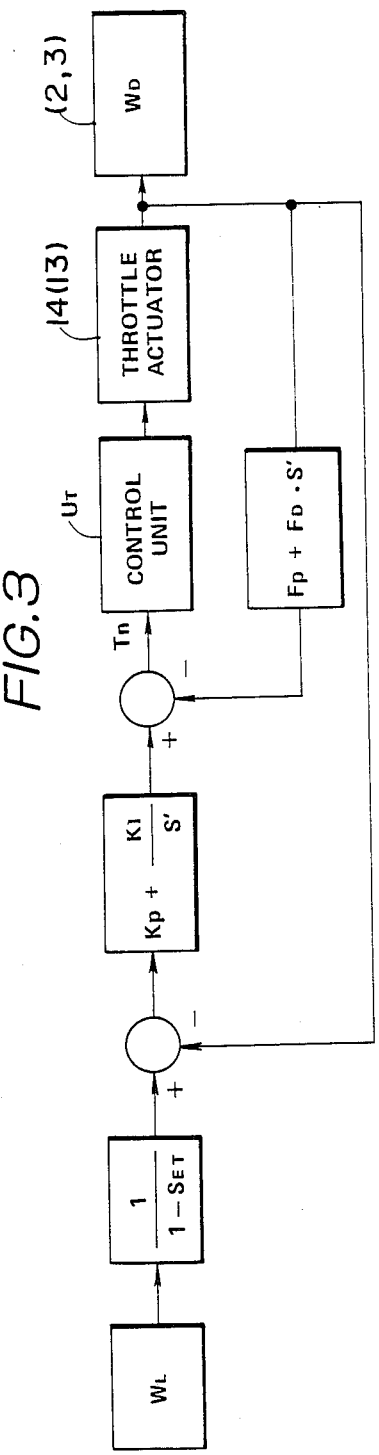
FIG. 3 is a block diagram illustrating a feedback control of a throttle valve.

In FIG. 3, the PI-PD control using the throttle control unit $U_T$ as described above is indicated as a block diagram, in which reference symbol "S'" denotes an operator and suffixes "n" and "n−1" denote, respectively, values of signals at the present sampling time and at the sampling time by one previous to the present sampling time.

BRAKE CONTROL

At the time of the slip control, the feedback control is effected using the brake control unit $U_B$ such that the spinning of the left and right driven wheels 2 and 3, respectively, is caused to become a predetermined target slip ratio $S_{BT}$ independently and separately from each other. In other words, the brake control is conducted by way of the feedback control such that the revolution number of the driven wheels $W_{BT}$ is determined by the following relationship (4):

$$W_{BT} = W_L/1 - S_{BT} \quad (4)$$

In this embodiment, the target slip ratio $S_{BT}$ by the brake is determined to a degree larger than the target slip ratio $S_{ET}$, as will be described below. In other words, the slip control in this embodiment is conducted so as to lessen a frequency of the use of the brake by increasing or decreasing the engine output to become the predetermined target slip ratio $S_{ET}$ for the throttle control or the predetermined target slip ratio $W_{ET}$ and, further, by increasing or decreasing the torque by the brake to cause the target slip ratio $S_{ET}$ or the target slip ratio $W_{ET}$ to become larger than the target brake slip ratio $S_{BT}$ or the revolution number of the driven wheels $W_{BT}$. Further, in this embodiment, the feedback control as satisfying the relationship (4) is carried out by the I-PD control that is superior in stability. More specifically, an amount of the brake operation (an amount of operation of the pistons 44 in the valves 30 and 31) $B_n$ can be given by the following relationship (5):

$$B_n = B_{n-1} + K_I(W_{Ln} \times 1/1 - S_{BT} - W_{Dn}) - F_P(W_{Dn} - W_{Dn-1}) - F_D(W_{Dn} - 2 \times W_{Dn-1} + W_{Dn-2}) \quad (5)$$

where $K_I$ is an integral coefficient,
$K_D$ is a proportional coefficient, and
$F_D$ is a differential coefficient.

When the amount of the brake operation $B_n$ is larger than zero, that is, when it is positive, the brake pressure is decreased. When the amount of the brake operation $B_n$ is equal to or smaller than zero, that is, when it is negative, the brake pressure is increased. The increase or decrease in the brake pressure is conducted by opening or closing the valves SV1 to SV4, inclusive, as have been described above. Adjustment of speeds of the increase or decrease in the brake pressure is made by adjusting ratios of the opening time to the closing time (duty ratios) of the valves SV1 to SV4, inclusive, by way of the duty control that is proportional to the absolute value of the brake operation amount $B_n$ given by the relationship (5) above. Accordingly, the absolute value of the brake operation amount $B_n$ becomes proportional to a speed of a variation in the brake pressures, and the duty ratio determining the speed of an increase or decrease in the brake pressures indicates the brake operation amount $B_n$.

Figure 4:
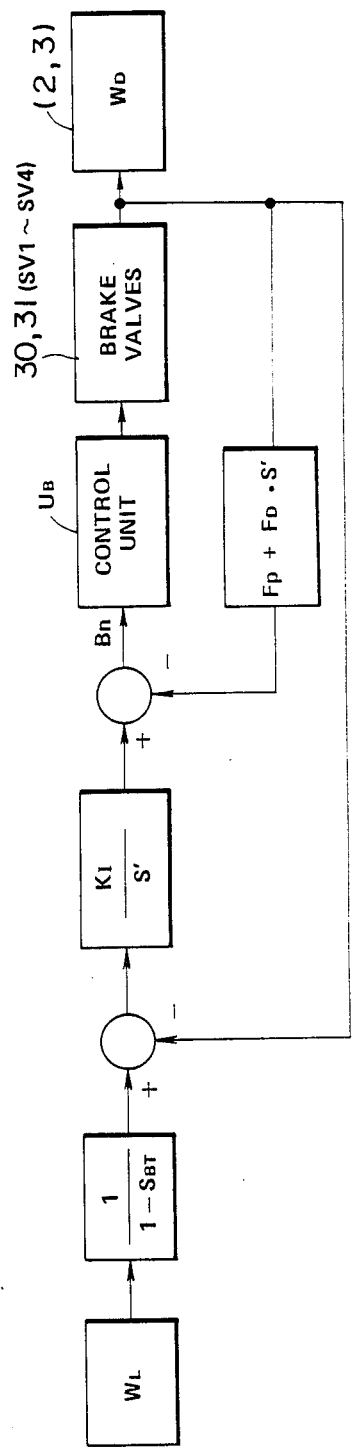
FIG. 4 is a block diagram illustrating a feedback control of a brake.

FIG. 4 indicates the I-PD control using the brake control unit $U_B$, as have been described above, as a block diagram, in which reference symbol "S'" denotes an operator.

BRIEF DESCRIPTION ON OVERALL SLIP CONTROL SYSTEM

Figure 5:
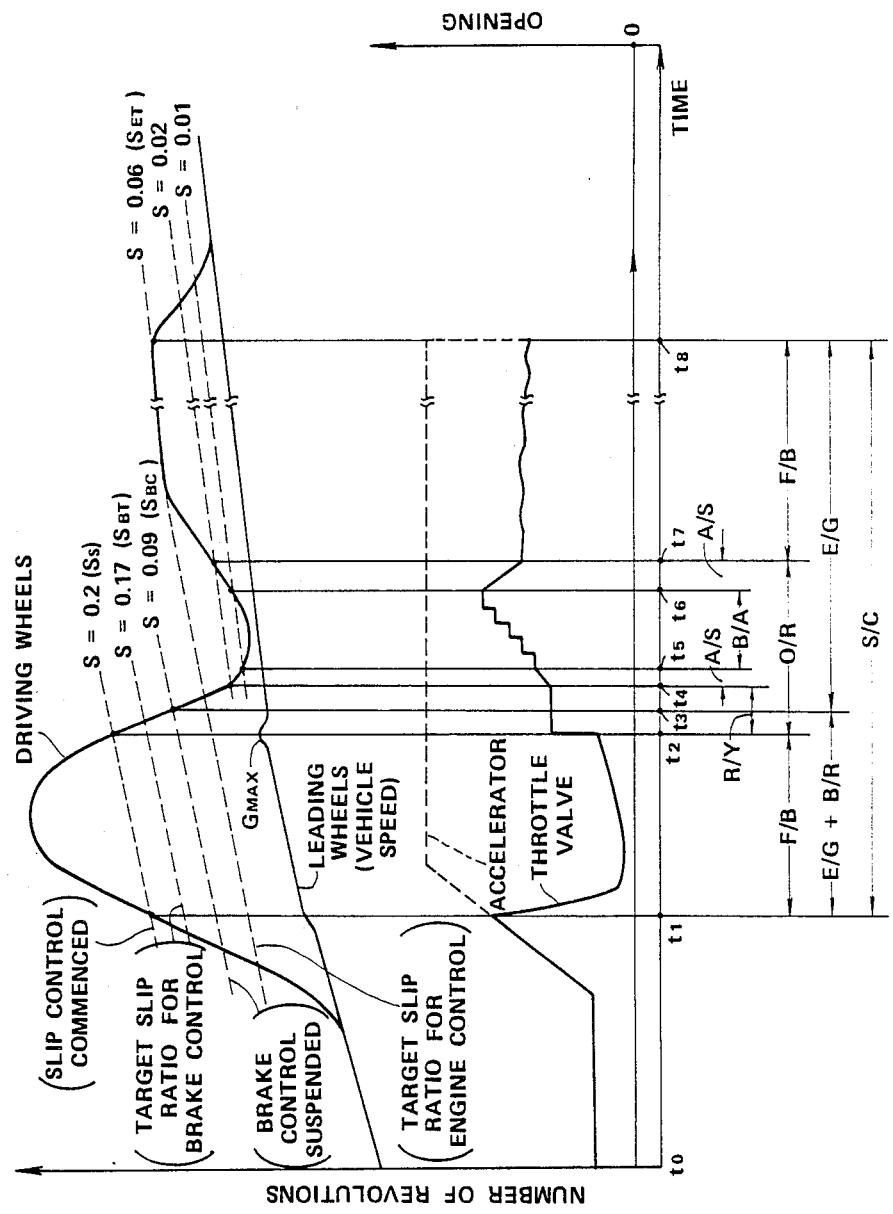
FIG. 5 is a diagramatical graph illustrating a control example in accordance with the present invention.
Figure 13:
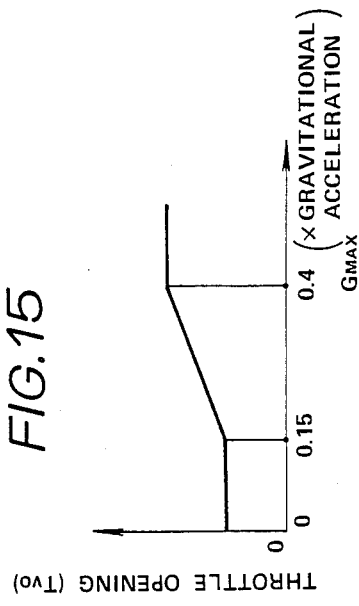
FIG. 13 is a graph showing the relationship of the grip force of the driven wheel with the transverse force thereof and the relationship of slip ratios with road surface friction coefficients.

An overall system of the slip control will be described herein with reference to FIG. 5 where reference symbols and figures have the following meanings:
S/C: region of the slip control;
E/G: slip control by the engine;
B/R: slip control by the brake;
F/B: feedback control
O/R: open loop control
R/Y: recovery control
B/A: backup control
A/S: absorb (shockless) control
S=0.2: slip ratio at the time of commencement of the slip control ($S_S$)
S=0.17: target slip ratio by the brake ($S_{BT}$)
S=0.09: slip ratio at the time of suspension (cancellation) of the slip control by the brake ($S_{BC}$)
S=0.06: target slip ratio by the engine ($S_{ET}$)
S=0.01-0.02: slip ratio in the region where the absorb control is effected
S=≦0.01: slip ratio in the region where the backup control is effected It is to be noted herein that the above figures are based on data obtained by actually driving a vehicle with spike tires on a frozen road surface. Furthermore, it is noted that the figures S=0.01-0.02 in the region where the absorb control is effected and the slip ratio S=0.09 at the time of the suspension of the slip control by the brake are set as invariable, respectively, on the one hand, and that the target slip ratio $S_{BT}$ by the brake, the target slip ratio $S_{ET}$ by the engine, and the slip ratio $S_S$ at the time of the start-up of the slip control vary with a state of road surfaces, on the other hand. In FIG. 5, the target slip ratio $S_{BT}$ by the brake, the target slip ratio $S_{ET}$ by the engine, and the slip ratio $S_S$ at the time of the start-up of the slip control are set as 0.17, 0.06, and 0.2, respectively, as one example. It is also noted that the figure S=0.2 for the slip ratio at the time of the start-up of the slip control uses a slip ratio at the time of the occurrence of a maximum grip force to be obtained when the spike tires were employed, as referred to as the solid line in FIG. 13. The reason why the slip ratio at the time of the start-up of the slip control is set as large as S=0.2 is so as to enable an actual slip ratio at the time when the maximum grip force is produced to be given. The target slip ratios $S_{BT}$ and $S_{ET}$ by the engine and the brake, respectively, are corrected in accordance with the slip ratio at the time of the occurrence of the maximum grip force. In FIG. 13, the solid line demonstrates a variation in the relationship of magnitudes of grip forces and transverse forces, represented as friction coefficients against road surfaces, during the use of spike tires with the corresponding slip ratios and the broken line demonstrates a variation in the relationship of magnitudes of grip and transverse forces, represented as friction coefficients against road surfaces, when normal tires are employed, with the corresponding slip ratios.

Given the above description, FIG. 5 will be described in the course of time.

(1) From $t_0$ to $t_1$:

No slip control is conducted over the course of time from $t_0$ to $t_1$ because the slip ratio S does not exceed S=0.2 that is the condition for the start-up of the slip control. In other words, when the spinning of the driven wheels is small, acceleration can be improved without the slip control, thereby enabling the driving utilizing a large grip force. It is a matter of course that, during this period of time, the peculiar character of the throttle opening against the accelerator opening is determined to be constant as demonstrated in FIG. 12.

(2) From $t_1$ to $t_2$:

At this point $t_1$ the slip control is commenced, and the slip ratio is equal to or higher than the point (S=0.09) of the suspension of the slip control by the brake. During the course of time, the slip ratio is so relatively large that the slip control is conducted by the decreasing generation of the torques by the engine and by the regulation by the brake. It is also noted that, since the target slip ratio (S=0.17) by the brake is higher than the target slip ratio (S=0.06) by the engine, brake pressures are applied to the brake when the spinning is large (S>0.17), on the one hand, and no brake pressures are applied thereto and the spinning is controlled so as to be reduced by the control of the engine only when the spinning is small (S<0.17).

Figure 15:
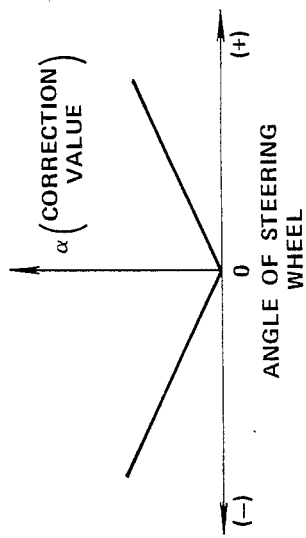
FIG. 15 is a graph showing the optimum throttle opening corresponding to the maximum acceleration during the recovery control.

(3) From $t_2$ to $t_4$ (recovery control):

During the course of a predetermined time (for example, 170 msec) after the reduction of the spinning (S<0.2), the throttle valve 13 is retained at a predetermined opening (open loop control). At the point of S=0.2 ($t_2$), the maximum acceleration $G_{MAX}$ is given, and the maximum road surface friction coefficient $\mu$ (the maximum grip force of the driven wheels) is estimated from the maximum acceleration $G_{MAX}$. The throttle valve 13 is retained for a predetermined period of time, as have been described above, so as to cause the driven wheels to produce the maximum grip forces. This control is carried out with the attempt to prevent the acceleration G of the vehicle body from being reduced immediately after the spinning reduced, when a response of the feedback control is not in time because the rapid occurrence of the spinning reduction. If the reduction of the spinning is predicted, that is, when the slip ratio is decreased below S=0.2, a predetermined torque is secured in advance so as to improve acceleration. The recovery control is particularly effective to avoid the excessive reduction in the slip ratio on account of a failure of the recovery control, leading to less acceleration or to avoid the re-occurrence of the spinning to a large extent by way of the excessive recovery control because the amount of the torques is increased in accordance with the occurrence of the spinning as shown in FIG. 15. It is noted herein that, although the maximum acceleration $G_{MAX}$ is the one obtained at the time of the start-up of the slip control, that is, at the time $t_1$ in FIG. 5, a maximum acceleration $G_{MAX}$ at the time when the spinning is being reduced as in this embodiment, that is, at the time $t_2$ in FIG. 5, is said to reflect a state of road surfaces more accurately if it is used as an amount of the torques increased by the recovery control.

The optimum throttle opening $T_{VO}$ for providing the driven wheels with torques capable of generating the maximum grip force can be theoretically given by a torque curve of the engine 6 and a transmission gear ratio. In this embodiment, however, the optimum throttle opening $T_{VO}$ is determined on the basis of a map, for example, as demonstrated in FIG. 15. The map is prepared in accordance with experimental procedures, in which $G_{MAX}$ is determined to become a constant value when it is equal to or lower than 0.15 or it is equal to or higher than 0.4 with measuring errors under consideration. It is to be noted here that, since the map indicated in FIG. 15 is prepared on the basis of a particular speed mode such as, for example, the first speed mode, a map for any other speed mode can be prepared by correcting the optimum throttle opening $T_{VO}$.

(4) From $t_4$ to $t_7$ (backup control and absorb control):

The backup control is designed to be conducted (open loop control) in order to cope with an unusual reduction in the slip ratio S. That is, when the slip ratio S becomes lower than S=0.01, the feedback control is stopped and the opening of the throttle valve 13 is caused to become larger in a stepwise manner.

When the slip ratio is between 0.01 and 0.02, that is, in the course of time from $t_4$ to $t_5$ and from $t_6$ to $t_7$, the absorb control is conducted for a smooth transfer to the next feedback control.

The backup control is conducted when neither the feedback control nor the recovery control can work effectively. The backup control to be used here is designed so as to allow a response time to become sufficiently faster than the feedback control.

A rate of the throttle opening in the backup control, in this embodiment, is designed so as to be increased for every 14 msec of the sampling time by 0.5% of the previous throttle opening.

Figure 16:
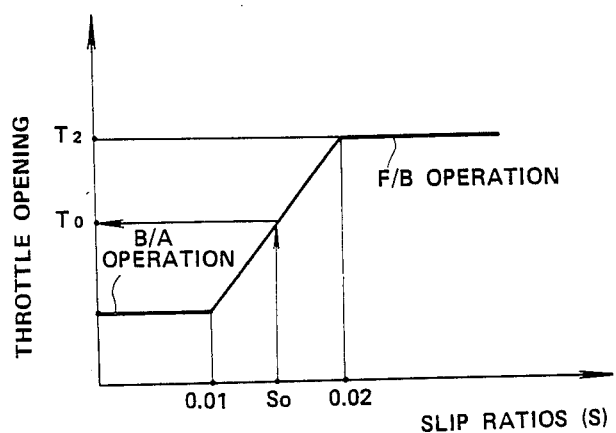
FIG. 16 is a graph showing the relationship of slip ratios for the absorb control with the throttle opening.

In the absorb control, as shown in FIG. 16, a throttle opening $T_0$ is determined by proportionating a throttle opening $T_1$ obtained by the operation of the backup control and a throttle opening $T_2$ obtained by the operation of the feedback control with the present slip ratio $S_0$.

(5) From $t_7$ to $t_8$:

By continuing the control conducted until the point $t_7$, the control is caused to be transferred smoothly into the slip control by the engine alone.

(6) $t_8$ et seq.

The slip control is suspended because the accelerator 69 is fully closed by the operator D. At this time, even if the throttle opening of the throttle valve 13 is left in the discretion of the operator D, there is no risk of the re-occurrence of the spinning because the with torque is decreased to a sufficient level. In this embodiment, the slip control is caused to be suspended, in addition to the full closure of the accelerator 69, when the target throttle opening by the slip control becomes smaller than the throttle opening determined by FIG. 12 corresponding to the accelerator opening operated by the operator D.

Figure 18:
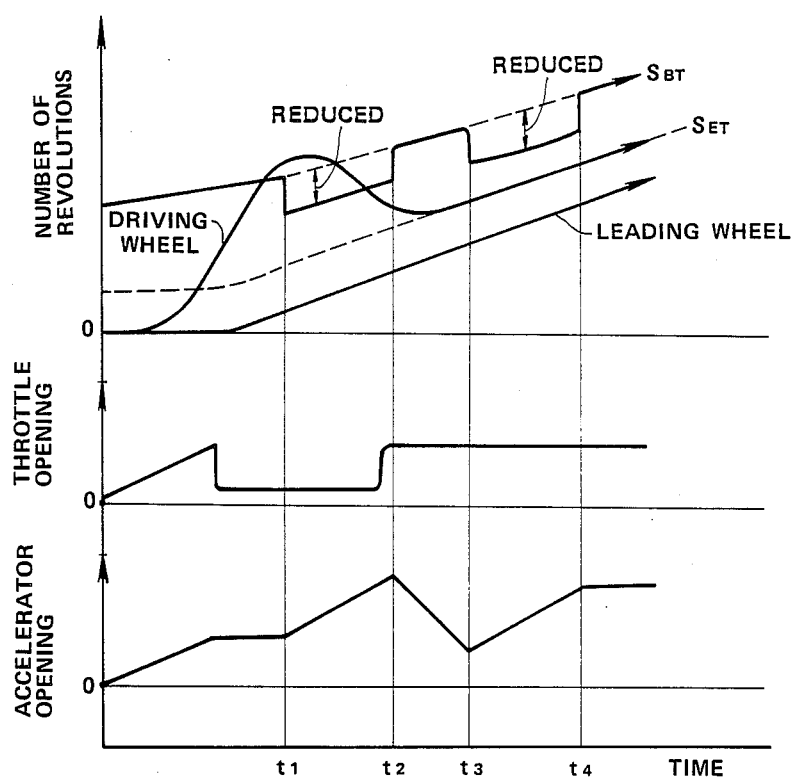
FIG. 18 is a graph illustrating a state in which a correction is made for rendering a ratio of the slip control by the brake higher, viz., decreasing a target slip ratio $S_{BT}$ for the brake control, when acceleration is required.

In this embodiment, the target slip ratio $S_{BT}$ for the brake control is corrected in a decreasing direction, as illustrated in FIG. 18, in order to render a ratio of the brake control higher when acceleration is required. More specifically, as shown in FIG. 18, the target slip ratio $S_{BT}$ for the brake control is shown to be corrected to decrease during the time periods from $t_1$ to $t_2$ and from $t_3$ to $t_4$, each when acceleration is required so as to become a speed at which the accelerator is pressed is faster than a predetermined value. By decreasing the target slip ratio $S_{BT}$ for the brake control in a manner as have been described immediately above, a difference between the target slip ratio $S_{BT}$ for the brake control and the target slip ratio $S_{ET}$ for the engine control is made smaller, thereby leading to an increase in the braking force, even if the present slip ratio is identical to each other, and consequently to an increase in surplus torques output by the engine 6 by the amount of the braking force increased. Accordingly, when the brake is released as the slip gets smaller, the vehicle is immediately accelerated by the surplus torque from the engine 6. In order to render the slip control by the brake control in a control ratio larger, it is necessary to render the difference between the target slip ratio $S_{BT}$ and the target slip ratio $S_{ET}$, as have been described above, so that it may be selected to get the target slip ratio $S_{BT}$ smaller and/or to get the target slip ratio $S_{ET}$ larger.

In this embodiment, the slip control by the brake is rendered larger, when the vehicle is stuck, by suspending the slip control by the engine control.

Furthermore, in order to alter the control ratio $S_{BT}/S_{ET}$ by the manual switch 71, it is designed in this embodiment to cause the target slip ratio $S_{ET}$ for the engine control to be set at a constant value while only the target slip ratio $S_{BT}$ for the brake control is altered.

Given this relationship, the control ratio $S_{BT}/S_{ET}$ is designed so as to be automatically set in accordance with a predetermined program when "AUTO" is selected by the button 71a.

When "HARD" is selected by the button 71b, the target slip ratio $S_{BT}$ becomes smaller, thereby decreasing the difference between the target slip ratio $S_{BT}$ for the brake control and the target slip ratio $S_{ET}$ for the engine control. As a result, if the present slip ratios are identical to each other, the braking force by the brake will be rendered larger and, at the same time, a surplus of the torque is produced by the engine 6 in the amount equivalent of the enlarged amount of the braking force. Accordingly, if the brake is released when the slip is reduced, an immediate acceleration can be achieved using the surplus torque by the engine 6.

When "SOFT" is selected by the button 71c, the target slip ratio $S_{BT}$ for the brake control becomes larger, thus decreasing the slip control by the brake. As a result, a smooth acceleration that is characteristic of the slip control by the engine is achieved.

DETAILED DESCRIPTION OF SLIP CONTROL

In accordance with the present invention, the overall slip control system will be described below with reference to FIGS. 6 to 11, inclusive. In the following description, reference symbol P denotes a step.

FIG. 6

(Main Routine)

In P1, the system is initialized, and it is discriminated in P2 whether or not a vehicle is in a stuck state or whether or not it is stuck in the mud and consequently in an unmovable state. This discrimination is made by checking whether or not a so-called "stuck" flag is set as will be described below. If NO in P2, the flow proceeds to P3 and it is then discriminated whether or not the accelerator 69 is completely closed. If NO in P3, it is then discriminated in P4 whether or not the present throttle opening is larger than the accelerator opening. If it is discriminated as NO in P4, the flow proceeds to P5 and it is then discriminated whether or not it is in the progress of the slip control. This discrimination is conducted by checking whether or not a slip control flag is set. If NO in P5, it is discriminated in P6 whether or not the slip or spinning would have occurred to a degree such that the slip control is required. This is discriminated by seeing whether a slip flag for the left front wheel 2 and the right front wheel 3 is set. If it is discriminated NO in P6, the flow proceeds to P7 and the slip control is suspended, leading to the normal driving.

If YES in P6, the flow proceeds to P8 where a slip control flag is set. Then, in P9, the initial value ($S=0.06$ as in this embodiment) of the target slip ratio $S_{ET}$ for the engine (throttle) is set and, in P10, the initial value ($S=0.17$ as in this embodiment) of the target slip ratio $S_{BT}$ for the brake is set. Thereafter, for the slip control, the brake control is effected in P11 and the engine control is done in P12, as will be described below. It is to be noted here that the determination of the initial values in both P9 and P10 is done on the basis of the maximum acceleration $G_{MAX}$ obtained by the previous slip control from the similar point of view as in P76 below.

In P5, if it is discriminated as YES, the flow proceeds to P11 and the slip control continues to be done.

If YES in P4, it is shown that no slip control is required and the flow advances to P14 where a slip control flag is reset. Then, the engine control is suspended in P15, and the brake control is conducted in P16. This brake control in P16 is done so as to cope with a state where the vehicle is stuck.

In P3, if it is discriminated YES, the flow proceeds to P13 where the brake is released and treatments will be done in P14 and thereafter.

If YES in P2, the flow proceeds to P15 and the treatments following P15 are conducted.

Figure 6A:
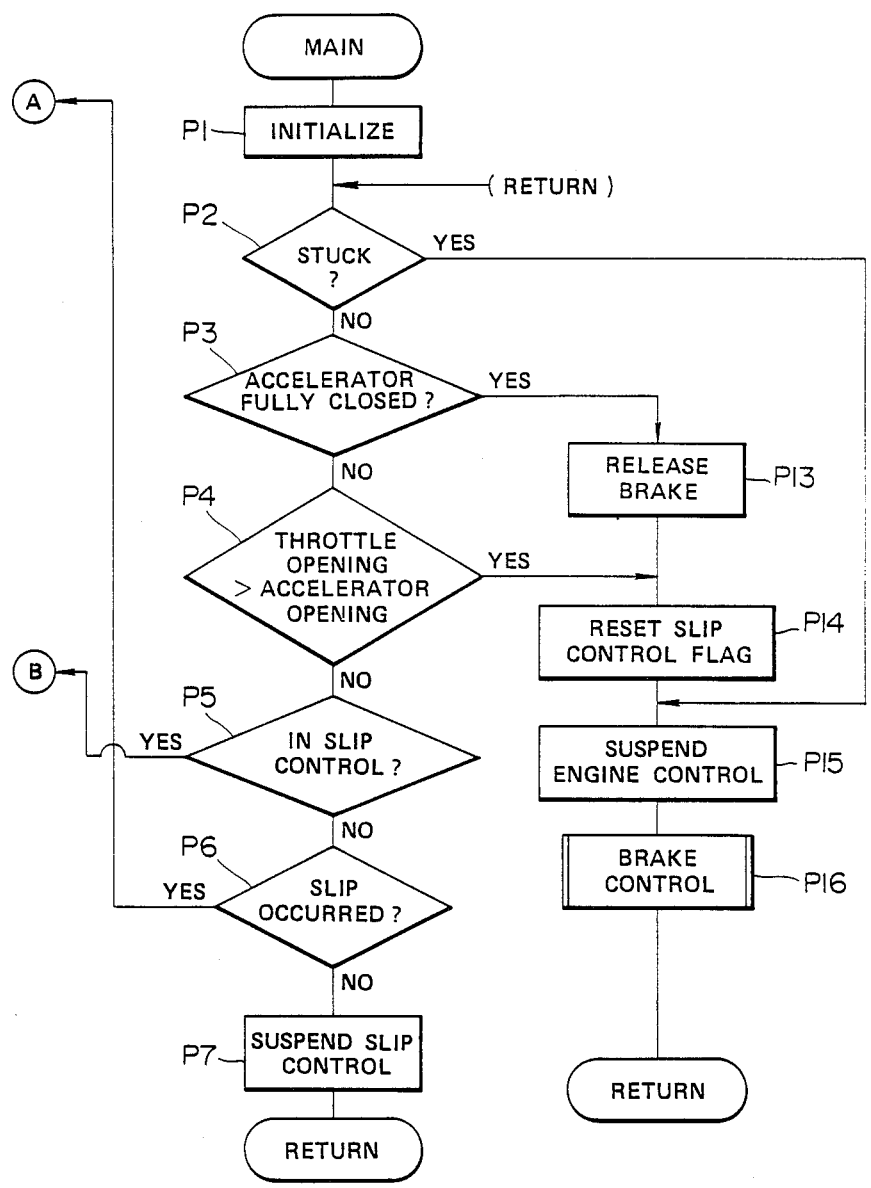
FIGS. 6 to 11 are each a flowchart illustrating a control example in accordance with the present invention.
Figure 6B:
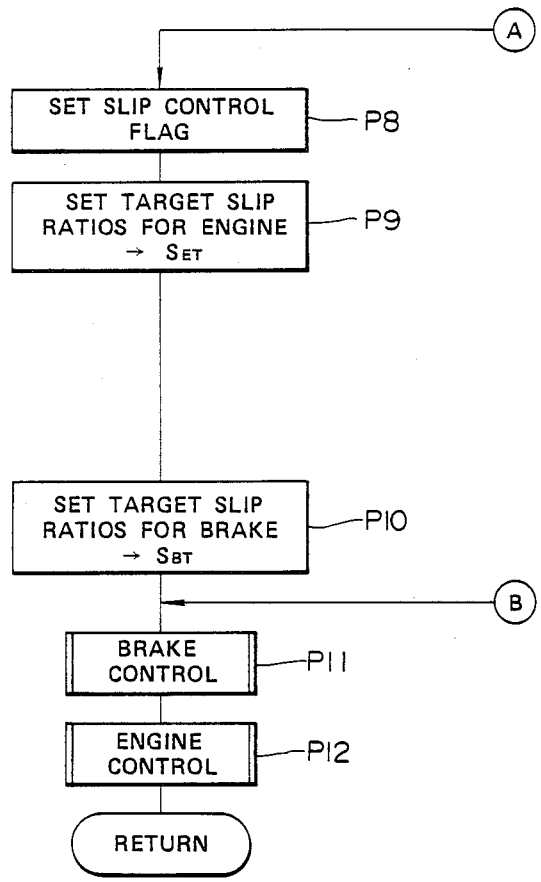
Figure 7:
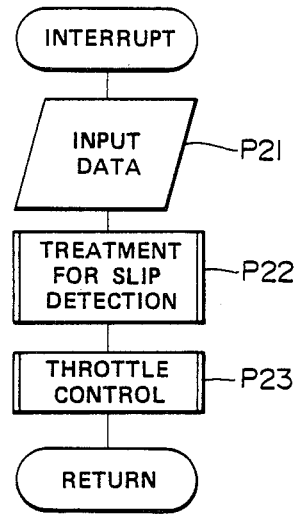

FIGS. 7 & 8:

The flowchart demonstrated in FIG. 7 is designed so as to interrupt into the main flowchart demonstrated in FIG. 6, for example, in every 14 msec.

In P21, signals from each of the sensors 61 to 68, inclusive, are input for data treatments. The flow then proceeds to P22 and the treatment of slip detection is conducted, and then the throttle control is conducted in P23.

Figure 8:
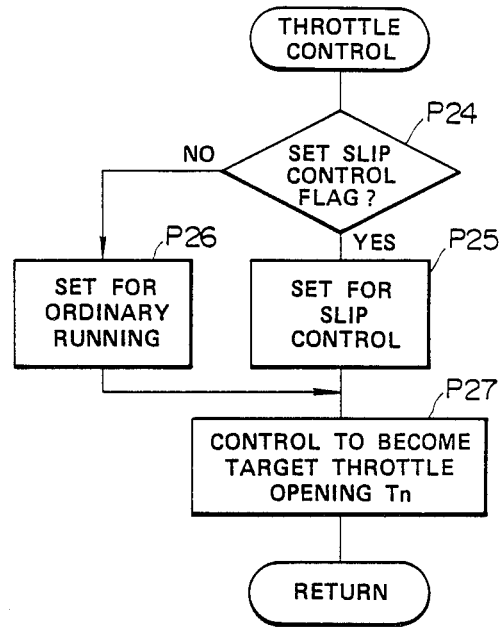

The throttle control in P23 is effected in accordance with a flowchart demonstrated in FIG. 8. In P24, it is discriminated whether or not a flag for the slip control is set, that is, whether or not the slip control is currently under way. If YES in P24, on the one hand, the throttle valve 13 is operated so as to select a control mode capable of reaching the predetermined target slip ratio $S_{ET}$ for the slip control, that is, without following the peculiar character demonstrated in FIG. 12. If NO in P24, on the other, the flow proceeds to P26 and the opening or closing of the throttle valve 13 is regulated by the operator D in his discretion, leading to the peculiar character demonstrated in FIG. 2. Subsequent to P25 and P26, the control is carried out, in P27, to realize the target throttle opening, as will be described below, that is, the control following P68, P70 and P71 and the control following the character of FIG. 12 are conducted as will be described below.

FIG. 9

(Slip Detection)

Figure 9B:
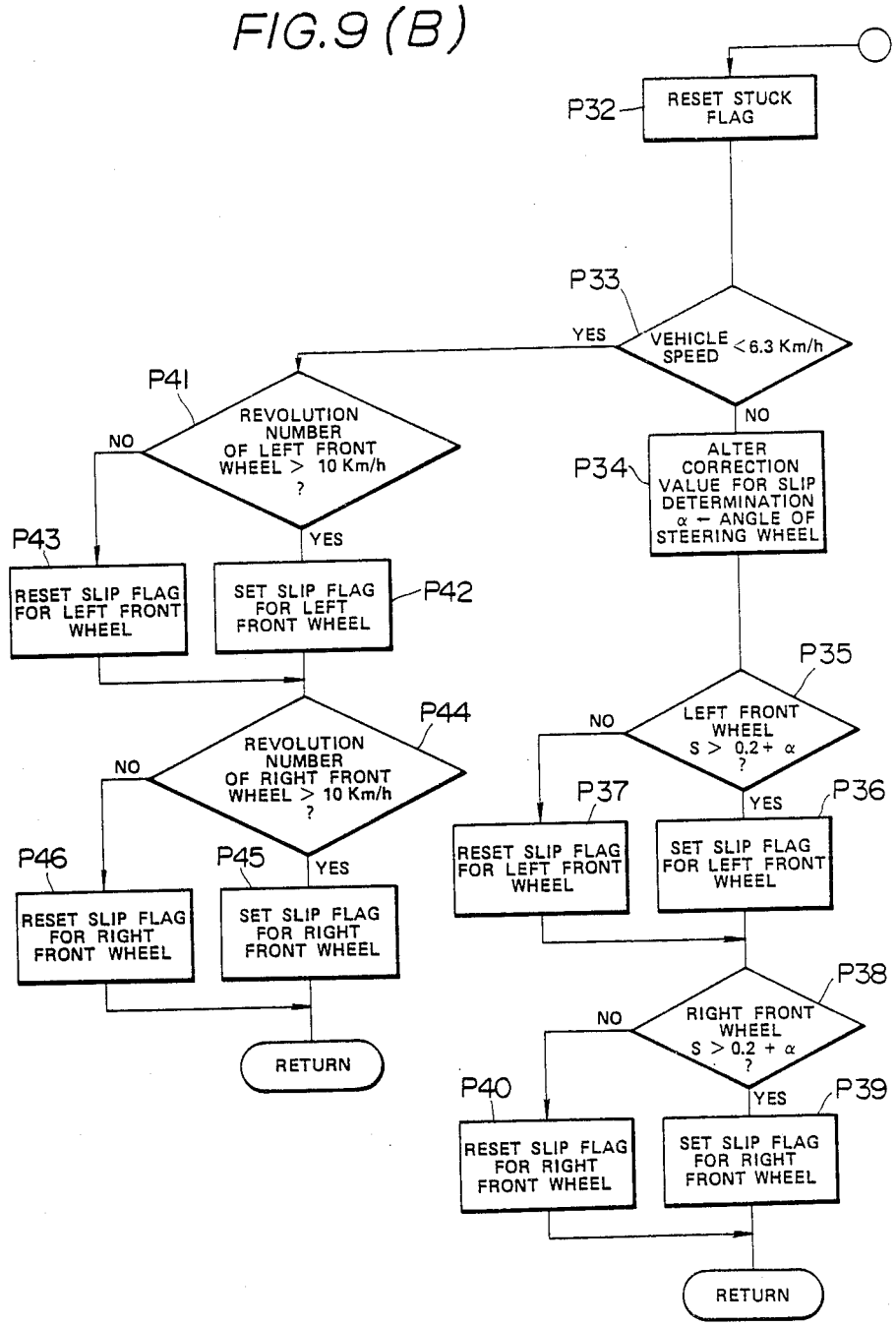

The flowchart of FIG. 9 corresponds to P22 of FIG. 7 and is to detect whether or not the slip or spinning subject to the slip control has occurred and is to detect whether or not a vehicle is stuck.

In P31, it is discriminated whether or not the clutch 7 is completely connected. If YES in P31, it is found that the vehicle is not stuck. Then, the flow proceeds to P32 where a "stuck" flag is reset and, in P33, it is discriminated whether or not the present vehicle speed is as slow as small, for example, below 6.3 km/h.

Figure 14:
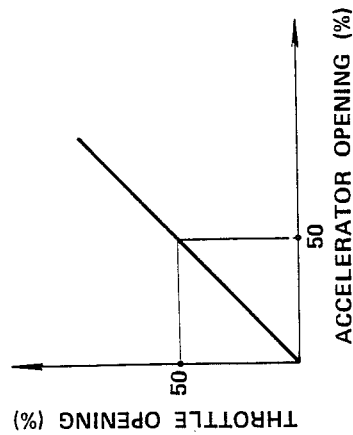
FIG. 14 is a graph showing correction values for correcting slip ratios at the commencement of the slip control in accordance with angles of the steering handle.

If NO in P33, the flow proceeds to P33 where a correction value $\alpha$ for the slip detection is computed in accordance with a steered angle of the steering wheel 70, as referred to in FIG. 14. Thereafter, in P35, it is discriminated whether or not a slip ratio for the left front wheel 2 as the lefthand driven wheel is larger than an addition of the above correction value α to the predetermined reference value of 0.2, that is, 0.2+α. If YES in P35, on the one hand, it is found that the left front wheel 2 is in a state of slippage so that a slip flag is set in P36. If NO in P35, the flow proceeds to P37 where a slip flag for the left front wheel 2 is reset. It is noted here that the correction value α is determined with a difference of revolutions between the inner and outer wheels at the time of the spinning, particularly a difference of revolutions between the driven wheel and the undriven wheel.

Subsequent to P36 and P37, a slip ratio for the right front wheel 3 is discriminated in P38 in substantially the same manner as described above on the left front wheel 2. If YES in P38, a slip flag for the right front wheel 3 is set in P39 and, if NO in P38, a slip flag therefor is reset in P40.

When it is discriminated as YES in P33, the vehicle speed is so slow that the computation of the slip ratio based on the relationship (1) utilizing the vehicle speed is predicted to give high errors in measurement. Accordingly, in this case, a state of slippage is determined merely by the detection of the numbers of revolutions of the driven wheels. That is, in P41, it is discriminated whether or not the number of revolutions of the left front wheel 2 is larger than that corresponding to the vehicle speed of 10 km/h. If YES in P41, a slip flag for the left front wheel 2 is set in P42 and, if NO in P41, a slip flag for the left front wheel 2 is reset.

After P42 and P43, a slip flag for the right front wheel 3 is set or reset in P44, P45 and P46 in substantially the same manner as in P41 to P43.

In P31, if it is discriminated as NO, there is the possibility that the vehicle is stuck. In this case, an operator D will try to get the vehicle free from the stuck state, as in the mud, with the clutch connected halfway. At this moment, the flow moves to P51 where it is discriminated whether or not a difference of the revolution numbers between the left and right front wheels 2 and 3 as the driven wheels is small (for example, as large as 2 km/h, when the number of revolutions is translated into the vehicle speed). If NO in P51, it is discriminated in P52 whether or not the vehicle is currently in the progress of the stuck control. If NO in P52, it is discriminated in P53 whether or not the number of revolution of the right front wheel 3 is larger than the number of revolutions of the left front wheel 2. If YES in P53, it is discriminated in P54 whether or not the number of revolutions of the right front wheel 3 is larger than 1.5 times as much as the number of revolutions of the left front wheel 3. If YES in P54, on the one hand, the stuck flag is set in P56 and, if NO in P54, on the other hand, it is found that the vehicle is not stuck so that the treatments following P32, as described above, will be carried out.

If NO in P53, it is discriminated in P55 whether or not the number of revolutions of the left front wheel 2 is larger than 1.5 times as much as the number of revolutions of the right front wheel 3. If YES in P55, the flow proceeds to P56 and, if NO in P55, the flow proceeds to P32.

After P56, it is discriminated in P57 whether or not the vehicle speed is faster than 6.3 km/h. If YES in P57, it is set in P58 such that the numbers of revolutions of the front wheels 2 and 3 become 1.25 times as much as the numbers of revolutions of the respective undriven wheels representing the vehicle speed equivalent to the slip ratio S=0.2. If NO in P57, the target numbers of revolutions of the front wheels 2 and 3 are set to be equivalent each to the vehicle speed of 10 km/h in P59.

If YES in P51, the brake is released gradually in P60. If YES in P52, the flow proceeds directly to P56 without any treatment in P53, P54 and P55.

FIG. 10

(Engine Control)

Figure 10:
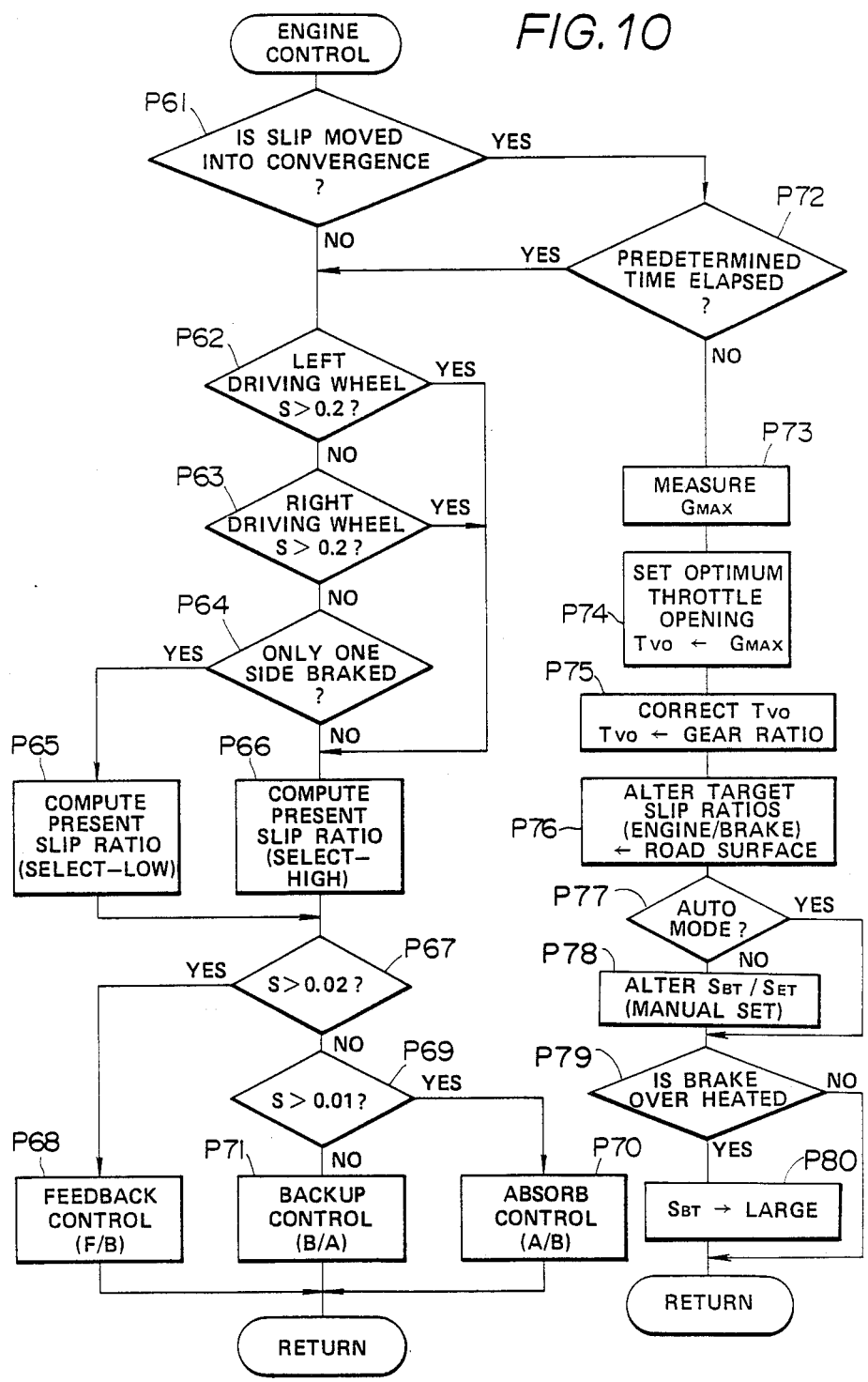

The flowchart of FIG. 10 corresponds to P12 of FIG. 6.

In P61, it is discriminated whether or not a state of the slip is moved into a reducing state, or whether the point $t_2$ of FIG. 5 is passed. If NO in P61, it is discriminated in P62 whether or not the slip ratio of the left front wheel 2 is larger than S=0.2. If NO in P62, it is discriminated in P63 whether or not the slip ratio of the right front wheel 3 is larger than S=0.2. If NO in P63, it is discriminated in P64 whether or not only one of the left and right front wheels 2 and 3 is under the brake control, viz., whether or not the vehicle is running on a split road. If YES in P64, on the one hand, the flow proceeds to P65 and the present slip ratio is set to the driven wheel with the lower slip ratio (select-low). If NO in P64, on the other hand, the flow proceeds to P66 and the present slip ratio is set to the driven wheel with the higher slip ratio (select-high). If YES in P62 and in P63, the flow proceeds to P66 in each case.

The select-high step in P66 is to enable the frequency of the braking to be lessened more by computing the present slip ratio in such a way that the slip or spinning of the driven wheel that is likely to slip more than the other driven wheel is controlled. The select-low step in P65 is to enable the slip or spinning of the driven wheel likely to slip more than the other to be controlled by the brake and, at the same time, to enable the vehicle to be driven using the grip force produced by the driven wheel that is less likely to slip, when the vehicle is running on a road such as a split road having different friction coefficients on road surfaces with which the left and right driven wheels are in contact. In the select-low step, it is preferred to limit its use, for example, to a particular period of time in order to avoid the excessive use of the brake or to provide backup means for suspending the select-low step in the event of the brake being overheated.

After P65 or P66, it is discriminated in P67 whether or not the present slip ratio is larger than S=0.02. If YES in P67, the throttle valve 13 is regulated for the slip control by way of the feedback control in P68. In this case, the target throttle opening Tn of the throttle valve 13 is set to become the target slip ratio $S_{ET}$ set in P9 or altered in P76 as will be described below.

If NO in P67, it is discriminated in P69 whether or not the present slip ratio is larger than S=0.01. If YES in P69, the flow proceeds to P70 and the absorb control is made as have been described above. If NO in P69, the backup control is done in P71, as have been described above.

If YES in P61, the flow proceeds to P72 where it is discriminated whether or not a predetermined period of time has passed after the slip reduced, viz., whether or not a period of time for the recovery control has passed—170 msec in this embodiment. If NO in P72, the treatments following P73 are carried out to effect the recovery control. That is, in P73, the maximum acceleration $G_{MAX}$ of the automobile 1 is measured at the point $t_2$ of FIG. 5 and, in P74, the optimum throttle opening $T_{VO}$ capable of obtaining the maximum acceleration $G_{MAX}$ is set as shown in FIG. 15. Then, in P75, the optimum throttle opening $T_{VO}$ obtained in P74 is corrected in accordance with the present speed mode of the transmission 8. Since the torque applied to the driven wheels varies with the speed mode, it is noted in this embodiment that the optimum throttle opening $T_{VO}$ is set in P74 for a reference speed mode and then in P75, the difference of the speed mode is corrected. Thereafter, in P76, the target slip ratio $S_{ET}$ for the slip control by the engine (throttle) and the target slip ratio $S_{BT}$ for the slip control by the brake are altered by estimating a road surface friction coefficient from the maximum acceleration $G_{MAX}$ obtained in P73. Alteration of the target slip ratios $S_{ET}$ and $S_{BT}$ will be described below.

After P76, it is discriminated in P77 whether or not "AUTO" is selected on the button 71. If YES at P77, the flow advances directly to P79. If NO at P77, the switch 71 is in a state where "HARD" or "SOFT" is selected, so that the control ratio $S_{BT}/S_{ET}$ is altered in accordance with this selection and then the flow moves to P79.

In P79, it is discriminated whether or not the brake is over heated. If YES at P79, the target slip ratio $S_{BT}$ for the brake control is corrected in an increasing direction and an abuse of the brake is avoided. If NO at P79, the control is stopped.

If YES in P72, it is found that the recovery control is finished so that the flow proceeds to P62 for the further treatments as have been described.

Figure 11:
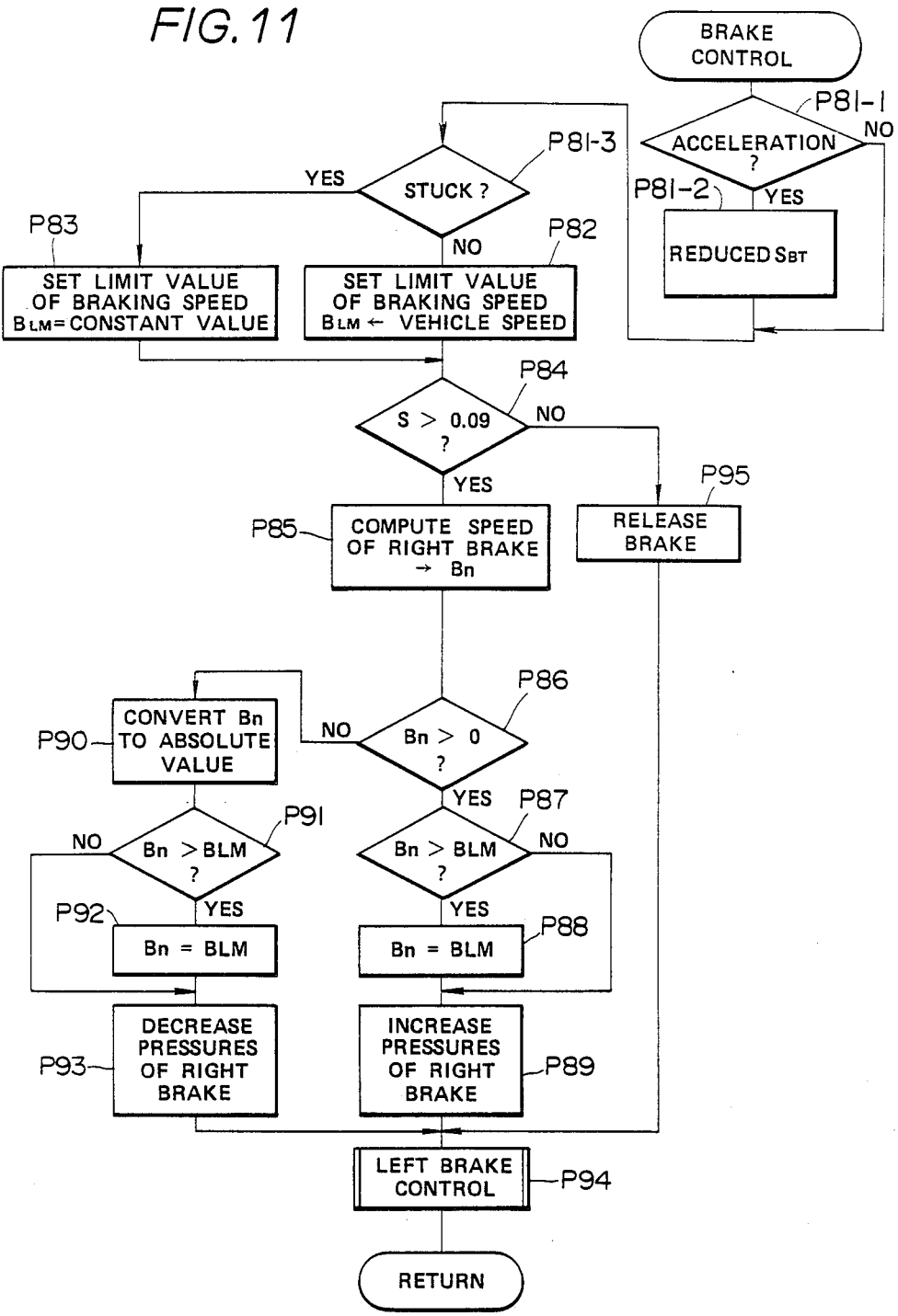

FIG. 11
(Brake Control)

The flowchart of FIG. 11 corresponds to P11 and P16 of FIG. 6.

In P81-1, it is discriminated whether or not acceleration is currently required. In this embodiment, this discrimination is effected by determining whether or not the rate at which the accelerator 69 is pressed is equal to or faster than a predetermined value, as described above. If YES at P81-1, the target slip ratio $S_{BT}$ for the brake control is corrected at P81-2 in a decreasing direction and the flow proceeds to P81-3. If NO at P81-1, the flow proceeds to P81-3 without the passage through P81-2. It is to be noted herein that, when the requirement for acceleration is selected by the switch 74 (as shown in FIG. 1), a discrimination of the requirement for acceleration at P81-1 is effected by the selection of the button on the switch 74.

In P81-3, it is discriminated whether or not the vehicle is stuck in the mud or the like. If NO in P81-3, the flow advances to P82 where the limit value (maximum value) $B_{LM}$ of a response speed Bn of the brake equivalent to the duty ratio for the opening or closing control of the valves SV1 to SV4 is set as a function variable in accordance with a vehicle speed—a function becoming larger as the vehicle speed gets faster. If YES in P81-3, the limit value $B_{LM}$ is set in P83 to be a constant value smaller than the limit value $B_{LM}$ of P82. The treatments in P82 and P83 are arranged with the attempt unlikely to cause any vibration to occur on account of a speed of an increase or decrease in the brake pressure becoming too fast if the brake response speed Bn computed by the relationship (5) above is used as it is. In addition, it is particularly undesirable to cause the braking force on the driving wheels to vary rapidly in order to get the vehicle free from the stuck state so that the limit value $B_{LM}$ in P83 is set smaller than that in P82.

After P82 or P83, it is discriminated in P84 whether or not the slip ratio is larger than S=0.09 that is the point of the brake control being suspended. If YES in P84, an operation speed Bn of the brake 22 for the right front wheel is computed in P85, which is equivalent to Bn in the I-PD control of FIG. 4. Thereafter, in P86, it is discriminated whether or not the operation speed Bn is larger than zero. This discrimination is to see whether or not the brake pressure is in the decreasing direction by setting the direction of decreasing the brake pressure to a positive value, viz., larger than zero, and the direction of increasing the brake pressure to zero or a negative value smaller than zero. If YES in P86, it is discriminated in P87 whether or not Bn is larger than $B_{LM}$. If YES in P86, on the one hand, Bn is set to the limit value $B_{LM}$ in P88 and then in P89, the brake pressure of the right brake 22 is decreased. If NO in P87, the flow proceeds to P89 and the brake pressure thereof is increased in accordance with Bn set in P85.

When NO at P86, it is found that Bn is a negative value or zero so that Bn is reduced in P90 to the corresponding absolute value followed by the treatments in P91 to P93, inclusive. The treatments in P91 to P93 are carried out to increase the brake pressure of the right brake 22 as in substantially the same manner as those in P87 to P89, inclusive.

If NO in P84, the flow proceeds to P95 and the brake control is suspended by the release of the brake.

After P89, P93 or P95, the flow proceeds to P94 where the brake pressure of the left brake 21 is increased or decreased in substantially the same manner as that of the right brake 22 is treated in P84 to P93, P95 inclusive.

It is noted herein that, if a difference between the actual revolution numbers and the target revolution numbers (an actual slip ratio and the target slip ratio) is large, the integral coefficient $K_I$ in the above relationship (5), for example, is preferably corrected in order to prevent acceleration from being impaired by the excessive use of the brake and the engine from being stalled. This correction may be done using the above integral coefficient $K_I$ is caused to become smaller in a step between P85 and P86.

ALTERATION OF TARGET SLIP RATIOS $S_{ET}$ AND $S_{ET}$ (P76)

Figure 17:
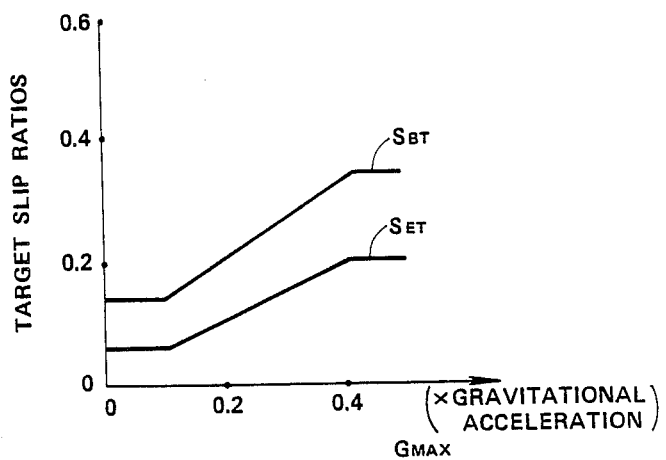
FIG. 17 is a table illustrating an example of a map for determining a target slip ratio.

In P76, the target slip ratio $S_{ET}$ for the engine and the target slip ratio $S_{BT}$ for the brake are altered, as demonstrated in FIG. 17, on the basis of the maximum acceleration $G_{MAX}$ measured in P73. As apparent from FIG. 17, the slip ratios $S_{ET}$ and $S_{BT}$, as a rule, get larger as the maximum acceleration $G_{MAX}$ gets larger, and each of the limit value therefor is set.

Notwithstanding the alteration of the target slip ratios $S_{ET}$ and $S_{BT}$, if a slip ratio $S_{BC}$ is set at the point of suspension of the slip control by the brake as an intermediate value between $S_{ET}$ and $S_{BT}$, the intermediate value $S_{BC}$ is not required, as a rule, to be altered. However, for example, if the intermediate value $S_{BC}$ is positioned in a constant distance at a position closer to the target slip ratio $S_{ET}$ by 20% of a deviation value of the target slip ratios $S_{ET}$ and $S_{BT}$, the intermediate value $S_{BC}$ may be altered pursuant to the alterations of the target slip ratios $S_{ET}$ and $S_{BT}$.

The following is a description on an influence of the determination of the target slip ratios $S_{ET}$ and $S_{BT}$ on the driving of the automobile 1.

(1) Grip Forces of Driving Wheels

The target slip ratios $S_{ET}$ and $S_{BT}$ are offset as a whole in the upward or downward direction of FIG. 17. In order to make the grip force greater, they are offset in the upward direction. This can be said true as long as the slip ratio in the range of 0.2 to 0.3 or below is used because the road surface friction coefficient $\mu$ is in the increasing direction up to the slip ratio being 0.2 to 0.3 as the peculiar character of spike tires, as shown in FIG. 13.

(2) Acceleration Feelings

The acceleration feeling varies with the difference between the target slip ratios $S_{ET}$ and $S_{BT}$. This point has already been described above so that a duplicate description thereon will be omitted here.

(3) Smoothness in Acceleration

Smoothness in acceleration can be attained when the target slip ratio $S_{BT}$ for the brake gets large, viz., relatively large as compared to the target slip ratio $S_{ET}$ for the engine. In this case, the engine control is caused to prevail over the brake control, thereby leading to a smooth variation in torques, which is the advantage of the engine control.

(4) Cornering Stability

A stability during the cornering can be obtained when the target slip ratio $S_{ET}$ for the engine gets small, viz., relatively small compared to the target slip ratio $S_{BT}$ for the brake. As will be apparent from FIG. 13, in the region from $S=0.2$ to $S=0.3$ or below, where the maximum grip force is created, the reduction in the target slip ratio can make the grip forces of the driven wheels smaller and, at the same time, make the transverse force as large as possible.

The characteristic modes as represented by (1) to (4) above, may be selected automatically or manually by the operator D (mode selection).

In the embodiment described above, the target slip ratio $S_{BT}$ for the brake is set larger than the target slip ratio $S_{ET}$ for the engine so that no brake control is carried out when a degree of the slip or spinning is small, leading to a less frequency of uses of the brake, and that a burden of the brake control is lessened even when a large slip or spinning occurs. In addition, since there is set the intermediate point ($S_{BC}$) between the target slip ratios $S_{BT}$ and $S_{ET}$, where the slip control by the brake is suspended, the brake pressure is caused to be decreased to a sufficient degree at the time of the suspension of the brake control so that a rapid variation in torques is rendered unlikely. In this embodiment, of course, the target slip ratio $S_{ET}$ for the engine is set to be equal to the target slip ratio $S_{BT}$ for the brake, and the slip ratio $S_{BC}$ at the time of the suspension of the brake control is set to be larger than the target slip ratios $S_{ET}$ and $S_{BT}$.

In accordance with the present invention, the embodiments have been described, but it should be understood that the present invention is by no means construed to be limited to the embodiments above and any changes or modifications as will be described below should be encompassed within the scope of the present invention.

a. For the simplification of the control, the target slip ratio for the brake control may be set so as to be identical to the target slip ratio for the engine control, and the brake control may be designed to be conducted for a constant period of time after the commencement of the slip control, namely, after $t_1$ in FIG. 5.

It is also possible that the target slip ratio for the brake control is set to be identical to the target slip ratio for the engine control and the brake control is carried out only when the slip or spinning of the driven wheels is being increased. That is, the brake control may be conducted when a variant of the revolution numbers of the driven wheels, $dW_D/dt$, is positive or when a variant of the slip ratios, $dS/dt$, is positive.

b. Means for adjusting the torque generated by the engine 6 may be preferably of the type regulating a factor that exerts the most influence upon the engine output. That is, it is preferred that the torque output is adjusted by a so-called load control. It is preferable to adjust an amount of a mixture fuel inthe Otto-type engine such as, for example, a gasoline engine, and to adjust an amount of a fuel injection in a diesel engine.

In addition to the load control, the ignition timing may be adjusted in the Otto-type engine, and the timing of the fuel injection may be adjusted in the diesel engine. In a supercharged engine, a supercharged pressure may be adjusted. Of course, a power source may include, in addition to an internal combustion engine, an electric motor. In this case, the output torque may be adjusted by the adjustment of an electric power to be supplied to the motor.

c. The automobile 1 may include, in addition to the one with the front wheels 2 and 3 as the driven wheels, the ones with the rear wheels 4 and 5 as the driven wheels and with all the four wheels as the driven wheels.

d. In order to detect a state of the slip or spinning of the driven wheels, it may be detected directly from the revolution numbers of the driven wheels as in this embodiment above and indirectly by predicting a state of the slip or spinning thereof from a state of the vehicle. Such a state of the vehicle may include, for example, an increase in the output torque of a power source or in the number of revolutions, a variation in the accelerator opening, a variation in the revolution of the driving shaft, a state of steering wheels (cornering), a state of the vehicle body lifted (acceleration), and a loadage. In addition to these factors, a road surface friction coefficient $\mu$ upon a magnitude of atmospheric temperatures, a rainfall, a snowfall or on an iced road may be detected automatically or input manually to predict a state of the slip or spinning of the driven wheels more adequately.

e. The hydraulic brake pressure regulating circuit in FIG. 2 and the sensores 64, 65 and 66 may be composed of a known ABS (anti-brake lock system).

f. The brake to be used for the slip control may be of the electromagnetic type as well as of the hydraulic type.

g. An alteration of the control ratio $S_{BT}/S_{ET}$ may be done by altering either or both of the target slip ratios $S_{BT}$ and $S_{ET}$. This alteration, of course, can be effected in a manner of three stages or more or of no stage. In the alteration of the control ratio $S_{BT}/S_{ET}$, the value $S_{BC}$ that becomes the point of the suspension of the slip control by the brake is preferably in between the target slip ratios $S_{BT}$ and $S_{ET}$. It is also possible to alter the middle value $S_{BC}$ as the target slip ratios $S_{BT}$ and/or $S_{ET}$ is altered.

The control ratio $S_{BT}/S_{ET}$ may be also altered by the suspension of the slip control by the engine.

In instances where the slip control is conducted using the target values as in this embodiment, the slip control can be done by altering a control amount which is determined by the difference value between the target slip ratio and actual slip ratio. In this case, the alteration of the control amount may be made at least either for the engine and the brake. In summary, there may be used any means that may alter a ratio of a decreased amount of the output torque attributable to a decrease in the revolution torque of the driven wheel to an amount of the braking force of the brake.

h. Acceleration requirements may be detected using any appropriate parameter such as a velocity of the accelerator pressed, a state of operation of the mode selecting switch 74, a pressed amount of the accelerator, a shift-down operation of the transmission 8, an accelerating degree of the vehicle body, and a pattern of vehicle speeds, particularly a degree of an increase in vehicle speeds.

The slip control may also be altered in a direction of increasing a ratio of the brake control after the start-up of the slip control in accordance with the requirement for acceleration by detecting the requirement for acceleration prior to the start-up of the slip control. In this case, in order to carry out more quickly the alteration increasing the ratio of the brake control, it may be possible to set the difference between the respective target slip ratios $S_{BT}$ and $S_{ET}$ at P9 and P10 so as to become small from the stage of the initial value. It is a matter of course that a degree of decreasing the difference between the target slip ratios $S_{BT}$ and $S_{ET}$ may be adjusted in accordance with a degree of the requirement for acceleration.

i. An increase in the control slip by the brake while the driven wheel is stuck may be made by reducing the difference between the target slip ratio $S_{BT}$ for the brake control and the target slip control $S_{ET}$ for the engine control instead of the suspension of the slip control by the engine. This difference may be reduced either by reducing the target slip ratio $S_{BT}$ or by increasing the target slip ratio $S_{ET}$. This may also be done by altering a control amount which is determined by difference value between the target slip ratio and actual slip ratio. The alteration of the control amount may be done at least either for the brake and the engine.

In summary, there may be used any appropriate means that may alter a ratio of a decreased amount of the output torque attributable to a reduction in the revolution torque of the driven wheel to an amount of the braking force of the brake at the time when the driven wheel is stuck or when it is not.

j. In order to more accurately discriminate whether or not the driven wheel is stuck, there may be added a condition of discrimination as to whether or not the number of revolutions of the driven wheel is sufficiently larger than the vehicle speed, viz., the number revolutions of the undriven wheel or, furthermore, as to whether or not the vehicle speed is almost zero, to the discrimination at P31, P51, and P53 to P55.

It is to be understood that the foregoing text and drawings relate to embodiments of the present invention given by way of examples but not limitation. Various other embodiments and variants are possible within the spirit and scope of the present invention.

What is claimed is:

1. A vehicle slip control apparatus for preventing an excessive degree of slippage or spinning by a driven wheel on a road surface by controlling a torque transmitted to the driven wheel, the slip control apparatus comprising:

output torque adjusting means for adjusting an output torque of a power source functioning as a source of the output torque;

braking force adjusting means for adjusting a braking force of a brake for the driven wheel;

slip detecting means for detecting a degree of slippage of the driven wheel on the road surface;

first slip control means for controlling said braking force adjusting means so as to allow the degree of slippage detected by said slip detecting means to reach a first target value, said first slip control means being operable when the degree of slippage detected by said slip detecting means is equal to or larger than a predetermined value;

second slip control means for controlling said output torque adjusting means so as to allow the degree of slippage detected by said slip detecting means to reach a second target value, said second slip control means being operable when the degree of slippage detected by said slip detecting means is equal to or larger than a predetermined value;

control ratio altering means for altering a control ratio of the first target value to the second target value by changing at least one of the first and second target values when slip control is executed using both the first and the second slip control means;

instruction means for providing an instruction to said control ratio altering means to alter said control ratio in accordance with requirements for driving the vehicle.

2. The slip control apparatus as claimed in claim 1, wherein said control ratio altering means changes only one of said first and second target values.

3. The slip control apparatus as claimed in claim 1, wherein said instruction means comprises a means for determining whether the vehicle is stuck, and wherein said instruction means provides an instruction so as to reduce the control ratio when it is detected that the vehicle is stuck.

4. The slip control apparatus as claimed in claim 3, wherein said means for determining whether the vehicle is stuck comprises a rotation number differential detecting means for detecting whether a difference between a rotation number of a right-hand driven wheel and a rotation number of a left-hand driven wheel is equal to or larger than a predetermined value.

5. The slip control apparatus as claimed in claim 4, wherein said means for determining whether the vehicle is stuck comprises a rotation ratio detecting means for detecting whether a ratio of the rotation number of the right-hand driven wheel to the rotation number of the left-hand driven wheel is equal to or larger than a predetermined value.

6. The slip control apparatus as claimed in claim 1, wherein said instruction means comprises means for determining that acceleration is required by a driver, and wherein said instruction means provides an instruction so as to reduce the control ratio when it is determined that acceleration is required.

7. The slip control apparatus as claimed in claim 6, wherein said control ratio altering means reduces the control ratio by reducing the first target value.

8. The slip control apparatus as claimed in claim 6, wherein said means for determining that acceleration is required comprises means for detecting whether a speed of pressing an accelerator pedal or a degree of pressing the accelerator pedal is equal to or larger than a predetermined value.

9. The slip control apparatus as claimed in claim 1, wherein said instruction means comprises manual selection means, and said instruction means provides an instruction to said control ratio altering means based on said manual selection means.

10. The slip control apparatus as claimed in claim 9, wherein said manual selection means comprises a manual switch having a first setting and a second setting; corresponding to an instruction by said instruction means to select a first control ratio and an instruction by said instruction means to select a second control ratio, respectively.

11. The slip control apparatus as claimed in claim 10, wherein said instruction means further comprises friction detecting means for detecting a friction coefficient on the road surface and an automatic setting means for setting an automatic control ratio in accordance with the friction coefficient detected by said friction detecting means, and wherein said manual switch further comprises a third setting corresponding to an instruction by said instruction means to select the automatic control ratio.

12. The slip control apparatus as claimed in claim 9, further comprising:
means for detecting whether the brake is in an overheated state;
correction means for correcting the instruction based on said manual selection means so as to increase said control ratio when the brake is in the overheated state.

13. The slip control apparatus as claimed in claim 1, wherein said power source comprises an engine having an output which can be adjusted by adjusting an amount of intake air by a throttle valve; and
wherein said first slip control means controls said throttle valve according to the following equation:

$$T_n = T_{n-1} + K_I \times [W_{Ln}/(1-S_{ET}) - W_{Dn}] + K_p \times [(W_{Ln} - W_{Ln-1})/(1-S_{ET}) - W_{Dn} + W_{Dn-1}] - F_p \times (W_{Dn} - W_{Dn-1}) - F_D \times (W_{Dn-2} \times W_{Dn-1} - W_{Dn-2})$$

in which
$W_L$ is a number of revolution of an undriven wheel;
$W_D$ is a number of revolution of the driven wheel;
$K_p$ is a proportional coefficient;
$K_I$ is an integral coeffiicient;
$F_p$ is a proportional coefficient;
$F_D$ is a differential coefficient;
$S_{ET}$ is the second target value; and
$T_n$ is a target opening of the throttle valve.

14. The slip control apparatus as claimed in claim 1, wherein said first slip control means controls said braking force adjusting means according to the following equation:

$$B_n = B_{n-1} + K_I \times [W_{Ln} \times 1/(1-S_{BT}) - W_{Dn}] - F_p \times (W_{Dn} - W_{Dn-1}) - F_D \times (W_{Dn-2} \times W_{Dn-1} + W_{Dn-2})$$

in which
$W_L$ is a number of revolutions of an undriven wheel;
$W_D$ is a number of revolutions of the driven wheel;
$K_I$ is an integral coefficient;
$F_p$ is a proportional coefficient;
$F_D$ is a differential coefficient;
$S_{BT}$ is the first target value; and
$B_n$ is an amount of operation of the brake.

15. The slip control apparatus as claimed in claim 1, wherein said first target value is larger than said second target value.

16. A vehicle slip control apparatus for preventing an excessive degree of slippage or spinning by a driven wheel on a road surface by controlling a torque transmitted to the driven wheel, the slip control apparatus comprising:
output torque adjusting means for adjusting an output torque of a power source functioning as a source of the output torque;
braking force adjusting means for adjusting a braking force of a brake for the driven wheel;
slip detecting means for detecting a degree of slippage of the driven wheel on the road surface;
first slip control means for controlling said braking force adjusting means so as to allow the degree of slippage detected by said slip detecting means to reach a first target value, said first slip control means being operable when the degree of slippage detected by said slip detecting means is equal to or larger than the first target value;
second slip control means for controlling said output torque adjusting means so as to allow the degree of slippage detected by said slip detecting means to reach a second target value, said second target value being smaller than said first target value, said second slip control means being operable when the degree of slippage detected by said slip detecting means is equal to or larger than the second target value;
control state altering means for altering a control state so as to execute slip control only by said first slip control means by suspending the second slip control means;
instruction means for providing an instruction to operate said control state altering means in accordance with requirements for driving the vehicle.

17. The slip control apparatus as claimed in claim 16, wherein said instruction means comprises a rotation number differential detecting means for detecting whether a difference between a rotation number of a right-hand driven wheel and a rotation number of a left-hand driven wheel is equal to or larger than a predetermined value, and wherein said instruction means provides the instruction to operate said control state altering means when the difference is equal to or larger than the predetermined value.

18. A vehicle slip control apparatus for preventing an excessive degree of slippage or spinning by a driven wheel on a road surface by controlling a torque transmitted to the driven wheel, the slip control apparatus comprising:
output torque adjusting means for adjusting an output torque of a power source functioning as a source of the output torque;
braking force adjusting means for adjusting a braking force of a brake for the driven wheel;
slip detecting means for detecting a degree of slippage of the driven wheel on the road surface;
first slip control means for controlling said braking force adjusting means so as to allow the degree of slippage detected by said slip detecting means to reach a first target value, said first slip control means being operable when the degree of slippage detected by said slip detecting means is equal to or larger than the first target value;

second slip control means for controlling said output torque adjusting means so as to allow the degree of slippage detected by said slip detecting means to reach a second target value, said second target value being smaller than said first target value, said second slip control means being operable when the degree of slippage detected by said slip detecting means is equal to or larger than the second target value;

control ratio altering means for altering a control ratio of the first target value to the second target value by changing a difference between the first and second target values;

instruction means for providing an instruction to said control ratio altering means to alter said control ratio in accordance with requirements for driving the vehicle.

19. The slip control apparatus as claimed in claim 18, wherein said instruction means comprises means for determining that acceleration is required by a driver, and wherein said instruction means provides an instruction so as to reduce the difference between the first and second target values when it is determined that acceleration is required.

20. The slip control apparatus as claimed in claim 18, wherein said instruction means comprises manual selection means, and said instruction means provides an instruction to said control ratio altering means based on said manual selection means.

* * * * *